United States Patent
Barton et al.

(10) Patent No.: US 9,858,428 B2
(45) Date of Patent: ***Jan. 2, 2018

(54) CONTROLLING MOBILE DEVICE ACCESS TO SECURE DATA

(71) Applicant: Citrix Systems, Inc., Fort Lauderdale, FL (US)

(72) Inventors: Gary Barton, Boca Raton, FL (US); Zhongmin Lang, Parkland, FL (US); Nitin Desai, Coral Springs, FL (US); James Robert Walker, Deerfield Beach, FL (US)

(73) Assignee: Citrix Systems, Inc., Fort Lauderdale, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 15/422,761

(22) Filed: Feb. 2, 2017

(65) Prior Publication Data

US 2017/0147825 A1   May 25, 2017

Related U.S. Application Data

(63) Continuation of application No. 14/607,593, filed on Jan. 28, 2015, now Pat. No. 9,602,474, which is a
(Continued)

(51) Int. Cl.
*G06F 21/60* (2013.01)
*H04L 29/06* (2006.01)

(52) U.S. Cl.
CPC ............ *G06F 21/602* (2013.01); *G06F 21/60* (2013.01); *H04L 63/0428* (2013.01)

(58) Field of Classification Search
CPC ...... G06F 21/62; G06F 21/6218; G06F 21/60; G06F 21/602; G06F 21/604
See application file for complete search history.

(56) References Cited

U.S. PATENT DOCUMENTS 5,805,803 A   9/1998   Birrell et al.
6,151,606 A   11/2000  Mendez
(Continued)

FOREIGN PATENT DOCUMENTS

CN   1313690 A   9/2001
CN   1613040 A   5/2005
(Continued)

OTHER PUBLICATIONS

Jan. 19, 2007 (JP) Notification of Reasons for Refusal—App. 2016-505456.
(Continued)

*Primary Examiner* — David Pearson
(74) *Attorney, Agent, or Firm* — Banner & Witcoff, Ltd.

(57) ABSTRACT

Various aspects of the disclosure relate to providing secure containers or data vaults for data of one or more managed applications. In some embodiments, each managed application may be assigned its own private data vault and/or may be assigned a shared data vault that is accessible to at least one other managed application. As the managed application executes, calls for access to the data may be intercepted and redirected to the secure containers. Data stored in a secure container may be encrypted according to a policy. Other aspects relate to deleting data from a secure container, such as via a selective wipe of data associated with a managed application. Further aspects relate to configuring and creating the secure containers, retrieving key information required to encrypt/decrypt the data stored in the secure containers, and publishing the managed applications, policy information and key information for download to a mobile device.

20 Claims, 12 Drawing Sheets

Related U.S. Application Data continuation of application No. 14/041,911, filed on Sep. 30, 2013, now Pat. No. 8,959,579, which is a continuation of application No. 14/039,632, filed on Sep. 27, 2013, now abandoned.

(60) Provisional application No. 61/861,910, filed on Aug. 2, 2013, provisional application No. 61/714,293, filed on Oct. 16, 2012, provisional application No. 61/806,577, filed on Mar. 29, 2013.

(56) References Cited

U.S. PATENT DOCUMENTS

| | | | |
|---|---|---|---|
| 6,154,172 A | 11/2000 | Piccionelli et al. |
| 6,480,096 B1 | 11/2002 | Gutman et al. |
| 6,609,198 B1 | 8/2003 | Wood et al. |
| 6,621,766 B2 | 9/2003 | Brewer et al. |
| 6,751,738 B2 | 6/2004 | Wesinger, Jr. et al. |
| 6,859,879 B2 | 2/2005 | Henn et al. |
| 6,883,098 B1 | 4/2005 | Roman et al. |
| 7,043,453 B2 | 5/2006 | Stefik et al. |
| 7,065,652 B1 | 6/2006 | Xu et al. |
| 7,159,120 B2 | 1/2007 | Muratov et al. |
| 7,240,015 B1 | 7/2007 | Karmouch et al. |
| 7,254,831 B2 | 8/2007 | Saunders et al. |
| 7,269,605 B1 | 9/2007 | Nguyen et al. |
| 7,340,772 B2 | 3/2008 | Panasyuk et al. |
| 7,349,913 B2 | 3/2008 | Clark et al. |
| 7,415,498 B2 | 8/2008 | Russo et al. |
| 7,437,752 B2 | 10/2008 | Heard et al. |
| 7,437,755 B2 | 10/2008 | Farino et al. |
| 7,490,073 B1 | 2/2009 | Qureshi et al. |
| 7,490,352 B2 | 2/2009 | Kramer et al. |
| 7,496,954 B1 | 2/2009 | Himawan et al. |
| 7,502,861 B1 | 3/2009 | Protassov et al. |
| 7,509,672 B1 | 3/2009 | Horwitz et al. |
| 7,526,800 B2 | 4/2009 | Wright et al. |
| 7,529,923 B2 | 5/2009 | Chartrand et al. |
| 7,596,593 B2 | 9/2009 | Mitchell et al. |
| 7,599,991 B2 | 10/2009 | Vargas et al. |
| 7,631,297 B2 | 12/2009 | Childress et al. |
| 7,644,377 B1 | 1/2010 | Saxe et al. |
| 7,665,125 B2 | 2/2010 | Heard et al. |
| 7,697,737 B2 | 4/2010 | Aull et al. |
| 7,716,240 B2 | 5/2010 | Lim |
| 7,761,523 B2 | 7/2010 | May et al. |
| 7,774,323 B2 | 8/2010 | Helfman |
| 7,779,408 B1 | 8/2010 | Papineau |
| 7,779,458 B1 | 8/2010 | Heiderscheit et al. |
| 7,788,535 B2 | 8/2010 | Bussa et al. |
| 7,788,536 B1 | 8/2010 | Qureshi et al. |
| 7,793,333 B2 | 9/2010 | Goh et al. |
| 7,865,888 B1 | 1/2011 | Qureshi et al. |
| 7,904,468 B2 | 3/2011 | Neil et al. |
| 7,950,066 B1 | 5/2011 | Zuili |
| 7,966,323 B2 | 6/2011 | Bocking et al. |
| 7,966,652 B2 | 6/2011 | Ganesan |
| 7,970,386 B2 | 6/2011 | Bhat et al. |
| 7,970,923 B2 | 6/2011 | Pedersen et al. |
| 8,001,278 B2 | 8/2011 | Huggahalli et al. |
| 8,012,219 B2 | 9/2011 | Mendez et al. |
| 8,037,421 B2 | 10/2011 | Scott et al. |
| 8,051,180 B2 | 11/2011 | Mazzaferri et al. |
| 8,060,074 B2 | 11/2011 | Danford et al. |
| 8,060,596 B1 | 11/2011 | Wootton et al. |
| 8,078,713 B1 | 12/2011 | Kim |
| 8,085,891 B2 | 12/2011 | Owen |
| 8,095,517 B2 | 1/2012 | Sandoval et al. |
| 8,095,786 B1 | 1/2012 | Kshirsagar et al. |
| 8,103,765 B2 | 1/2012 | Greifeneder et al. |
| 8,108,456 B2 | 1/2012 | Chen et al. |
| 8,126,128 B1 | 2/2012 | Hicks, III et al. |
| 8,126,506 B2 | 2/2012 | Roundtree |
| 8,132,242 B1 | 3/2012 | Wu |
| 8,181,010 B1 | 5/2012 | Uchil et al. |
| 8,200,626 B1 | 6/2012 | Katzer et al. |
| 8,214,887 B2 | 7/2012 | Clark et al. |
| 8,238,256 B2 | 8/2012 | Nugent |
| 8,239,918 B1 | 8/2012 | Cohen |
| 8,245,285 B1 | 8/2012 | Ravishankar et al. |
| 8,272,030 B1 | 9/2012 | Annan et al. |
| 8,285,681 B2 | 10/2012 | Prahlad et al. |
| 8,296,239 B2 | 10/2012 | Nonaka |
| 8,296,821 B2 | 10/2012 | Nakae |
| 8,332,464 B2 | 12/2012 | Dispensa et al. |
| 8,359,016 B2 | 1/2013 | Lindeman et al. |
| 8,365,258 B2 | 1/2013 | Dispensa |
| 8,365,266 B2 | 1/2013 | Bogner |
| 8,387,110 B1 | 2/2013 | Cooper |
| 8,402,011 B1 | 3/2013 | Bodenhamer |
| 8,406,748 B2 | 3/2013 | Raleigh et al. |
| 8,418,238 B2 | 4/2013 | Platt et al. |
| 8,463,253 B2 | 6/2013 | Chipalkatti et al. |
| 8,463,946 B2 | 6/2013 | Ferguson et al. |
| 8,468,090 B2 | 6/2013 | Lesandro et al. |
| 8,468,455 B2 | 6/2013 | Jorgensen et al. |
| 8,495,746 B2 | 7/2013 | Fissel et al. |
| 8,528,059 B1 | 9/2013 | Labana et al. |
| 8,549,656 B2 | 10/2013 | Blaisdell et al. |
| 8,560,709 B1 | 10/2013 | Shokhor et al. |
| 8,578,443 B2 | 11/2013 | Narain et al. |
| 8,584,114 B2 | 11/2013 | Rabinovich et al. |
| 8,601,562 B2 | 12/2013 | Milas |
| 8,613,070 B1 | 12/2013 | Borzycki et al. |
| 8,650,303 B1 | 2/2014 | Lang et al. |
| 8,650,620 B2 | 2/2014 | Chawla et al. |
| 8,660,530 B2 | 2/2014 | Sharp et al. |
| 8,719,898 B1 | 5/2014 | Barton et al. |
| 8,799,994 B2 | 8/2014 | Barton et al. |
| 8,806,570 B2 | 8/2014 | Barton et al. |
| 8,825,863 B2 | 9/2014 | Hansson et al. |
| 8,843,734 B2 | 9/2014 | Lim |
| 8,850,010 B1 | 9/2014 | Qureshi |
| 8,850,049 B1 | 9/2014 | Qureshi |
| 8,850,423 B2 | 9/2014 | Barkie et al. |
| 8,850,434 B1 | 9/2014 | Butikofer et al. |
| 8,856,909 B1 | 10/2014 | Chickering |
| 8,863,297 B2 | 10/2014 | Sharma et al. |
| 8,863,298 B2 | 10/2014 | Akella et al. |
| 8,863,299 B2 | 10/2014 | Sharma et al. |
| 8,881,228 B2 | 11/2014 | Qureshi |
| 8,881,229 B2 | 11/2014 | Barton et al. |
| 8,918,834 B1 | 12/2014 | Samuelsson |
| 8,931,038 B2 | 1/2015 | Pulier et al. |
| 9,183,380 B2 | 11/2015 | Qureshi et al. |
| 9,213,850 B2 | 12/2015 | Barton et al. |
| 9,280,377 B2 | 3/2016 | Lang et al. |
| 9,355,253 B2 | 5/2016 | Kellerman et al. |
| 9,356,895 B2 | 5/2016 | Chiu |
| 2001/0027383 A1 | 10/2001 | Maliszewski |
| 2001/0042045 A1 | 11/2001 | Howard et al. |
| 2002/0112047 A1 | 8/2002 | Kushwaha et al. |
| 2002/0120607 A1 | 8/2002 | Price et al. |
| 2002/0180790 A1 | 12/2002 | Broussard |
| 2003/0031319 A1 | 2/2003 | Abe et al. |
| 2003/0037103 A1 | 2/2003 | Salmi et al. |
| 2003/0046366 A1 | 3/2003 | Pardikar et al. |
| 2003/0065947 A1 | 4/2003 | Song et al. |
| 2003/0083954 A1 | 5/2003 | Namba |
| 2003/0103075 A1 | 6/2003 | Rosselot |
| 2003/0131245 A1 | 7/2003 | Linderman |
| 2003/0157947 A1 | 8/2003 | Fiatal et al. |
| 2003/0188193 A1 | 10/2003 | Venkataramappa |
| 2003/0229623 A1 | 12/2003 | Chang et al. |
| 2003/0229786 A1 | 12/2003 | Hollis et al. |
| 2003/0236861 A1 | 12/2003 | Johnson et al. |
| 2004/0006706 A1 | 1/2004 | Erlingsson |
| 2004/0010579 A1 | 1/2004 | Freese |
| 2004/0083273 A1 | 4/2004 | Madison et al. |
| 2004/0111640 A1 | 6/2004 | Baum |
| 2004/0117651 A1 | 6/2004 | Little et al. |
| 2004/0123153 A1 | 6/2004 | Wright et al. |
| 2004/0205233 A1 | 10/2004 | Dunk |
| 2004/0230807 A1 | 11/2004 | Baird et al. |

(56) References Cited

U.S. PATENT DOCUMENTS

| | | |
|---|---|---|
| 2004/0243349 A1 | 12/2004 | Greifeneder et al. |
| 2005/0027843 A1 | 2/2005 | Bozak et al. |
| 2005/0027862 A1 | 2/2005 | Nguyen et al. |
| 2005/0055578 A1 | 3/2005 | Wright et al. |
| 2005/0076082 A1 | 4/2005 | Le Pennec et al. |
| 2005/0076085 A1 | 4/2005 | Budd et al. |
| 2005/0097608 A1 | 5/2005 | Penke et al. |
| 2005/0111354 A1 | 5/2005 | Asano et al. |
| 2005/0149340 A1 | 7/2005 | Murakami et al. |
| 2005/0172241 A1 | 8/2005 | Daniels et al. |
| 2005/0193222 A1 | 9/2005 | Greene |
| 2005/0210252 A1 | 9/2005 | Freeman et al. |
| 2005/0255838 A1 | 11/2005 | Adams et al. |
| 2005/0262429 A1 | 11/2005 | Elder et al. |
| 2005/0265548 A1 | 12/2005 | Tsuchimura |
| 2005/0273592 A1 | 12/2005 | Pryor et al. |
| 2006/0005250 A1 | 1/2006 | Chu et al. |
| 2006/0048142 A1 | 3/2006 | Roese et al. |
| 2006/0070114 A1 | 3/2006 | Wood et al. |
| 2006/0075036 A1 | 4/2006 | Malik |
| 2006/0075123 A1 | 4/2006 | Burr et al. |
| 2006/0080432 A1 | 4/2006 | Spataro et al. |
| 2006/0085826 A1 | 4/2006 | Funk et al. |
| 2006/0094400 A1 | 5/2006 | Beachem et al. |
| 2006/0112428 A1 | 5/2006 | Etelapera |
| 2006/0117104 A1 | 6/2006 | Taniguchi et al. |
| 2006/0120526 A1 | 6/2006 | Boucher et al. |
| 2006/0141985 A1 | 6/2006 | Patel et al. |
| 2006/0147043 A1 | 7/2006 | Mann et al. |
| 2006/0161635 A1 | 7/2006 | Lamkin et al. |
| 2006/0161783 A1 | 7/2006 | Aiken et al. |
| 2006/0185004 A1 | 8/2006 | Song et al. |
| 2006/0224742 A1 | 10/2006 | Shahbazi |
| 2006/0225033 A1 | 10/2006 | Ye et al. |
| 2006/0225142 A1 | 10/2006 | Moon |
| 2006/0242685 A1 | 10/2006 | Heard et al. |
| 2006/0248577 A1 | 11/2006 | Beghian et al. |
| 2006/0253508 A1 | 11/2006 | Colton et al. |
| 2006/0259755 A1 | 11/2006 | Kenoyer |
| 2006/0282889 A1 | 12/2006 | Brown et al. |
| 2007/0005713 A1 | 1/2007 | LeVasseur et al. |
| 2007/0006327 A1 | 1/2007 | Lal et al. |
| 2007/0011749 A1 | 1/2007 | Allison et al. |
| 2007/0016771 A1 | 1/2007 | Allison et al. |
| 2007/0016907 A1 | 1/2007 | Benedetti et al. |
| 2007/0024646 A1 | 2/2007 | Saarinen et al. |
| 2007/0038764 A1 | 2/2007 | Maillard |
| 2007/0049297 A1 | 3/2007 | Gopalan et al. |
| 2007/0054627 A1 | 3/2007 | Wormald |
| 2007/0056043 A1 | 3/2007 | Onyon et al. |
| 2007/0072598 A1 | 3/2007 | Coleman et al. |
| 2007/0074033 A1 | 3/2007 | Adams et al. |
| 2007/0079249 A1 | 4/2007 | Pall et al. |
| 2007/0088825 A1 | 4/2007 | Hodul |
| 2007/0094220 A1 | 4/2007 | McCaffrey |
| 2007/0100938 A1 | 5/2007 | Bagley et al. |
| 2007/0109983 A1 | 5/2007 | Shankar et al. |
| 2007/0118558 A1 | 5/2007 | Kahandaliyanage |
| 2007/0136471 A1 | 6/2007 | Jardin |
| 2007/0143515 A1 | 6/2007 | Kershaw et al. |
| 2007/0156897 A1 | 7/2007 | Lim |
| 2007/0180447 A1 | 8/2007 | Mazzaferri et al. |
| 2007/0186106 A1 | 8/2007 | Ting et al. |
| 2007/0198656 A1 | 8/2007 | Mazzaferri et al. |
| 2007/0199051 A1 | 8/2007 | Parikh et al. |
| 2007/0204153 A1 | 8/2007 | Tome et al. |
| 2007/0204166 A1 | 8/2007 | Tome et al. |
| 2007/0208936 A1 | 9/2007 | Ramos Robles |
| 2007/0214272 A1 | 9/2007 | Isaacson |
| 2007/0226034 A1 | 9/2007 | Khan |
| 2007/0226225 A1 | 9/2007 | Yiu et al. |
| 2007/0226227 A1 | 9/2007 | Helfman |
| 2007/0226773 A1 | 9/2007 | Pouliot |
| 2007/0244987 A1 | 10/2007 | Pedersen et al. |
| 2007/0245409 A1 | 10/2007 | Harris et al. |
| 2007/0248085 A1 | 10/2007 | Volpano |
| 2007/0266422 A1 | 11/2007 | Germano et al. |
| 2007/0283324 A1 | 12/2007 | Geisinger |
| 2008/0027871 A1 | 1/2008 | Seo |
| 2008/0027982 A1 | 1/2008 | Subramanian et al. |
| 2008/0046580 A1 | 2/2008 | Lafuente et al. |
| 2008/0047006 A1 | 2/2008 | Jeong et al. |
| 2008/0047015 A1 | 2/2008 | Cornwall et al. |
| 2008/0052395 A1 | 2/2008 | Wright et al. |
| 2008/0066020 A1 | 3/2008 | Boss et al. |
| 2008/0066177 A1 | 3/2008 | Bender |
| 2008/0070495 A1 | 3/2008 | Stricklen et al. |
| 2008/0092215 A1 | 4/2008 | Soukup et al. |
| 2008/0127292 A1 | 5/2008 | Cooper et al. |
| 2008/0133729 A1 | 6/2008 | Fridman et al. |
| 2008/0134292 A1 | 6/2008 | Ariel et al. |
| 2008/0141335 A1 | 6/2008 | Thomas |
| 2008/0163188 A1 | 7/2008 | Siskind et al. |
| 2008/0163286 A1 | 7/2008 | Rudolph et al. |
| 2008/0167002 A1 | 7/2008 | Kim et al. |
| 2008/0178169 A1 | 7/2008 | Grossner et al. |
| 2008/0178300 A1 | 7/2008 | Brown et al. |
| 2008/0183820 A1 | 7/2008 | Golovchinsky et al. |
| 2008/0194296 A1 | 8/2008 | Roundtree |
| 2008/0196038 A1 | 8/2008 | Antonio et al. |
| 2008/0196082 A1 | 8/2008 | Sandoval et al. |
| 2008/0209506 A1 | 8/2008 | Ghai et al. |
| 2008/0209564 A1 | 8/2008 | Gayde et al. |
| 2008/0214300 A1 | 9/2008 | Williams et al. |
| 2008/0229117 A1 | 9/2008 | Shin et al. |
| 2008/0235760 A1 | 9/2008 | Broussard et al. |
| 2008/0263224 A1 | 10/2008 | Gilhuly et al. |
| 2008/0270240 A1 | 10/2008 | Chu |
| 2008/0271111 A1 | 10/2008 | Cox et al. |
| 2008/0304665 A1 | 12/2008 | Ma et al. |
| 2008/0313257 A1 | 12/2008 | Allen et al. |
| 2008/0313648 A1 | 12/2008 | Wang et al. |
| 2008/0317292 A1 | 12/2008 | Baker et al. |
| 2008/0318616 A1 | 12/2008 | Chipalkatti et al. |
| 2009/0006232 A1 | 1/2009 | Gallagher et al. |
| 2009/0028049 A1 | 1/2009 | Boudreau et al. |
| 2009/0030968 A1 | 1/2009 | Boudreau et al. |
| 2009/0037686 A1 | 2/2009 | Mendonca |
| 2009/0037976 A1 | 2/2009 | Teo et al. |
| 2009/0049425 A1 | 2/2009 | Liepert et al. |
| 2009/0051755 A1 | 2/2009 | Toya et al. |
| 2009/0064292 A1 | 3/2009 | Carter et al. |
| 2009/0075630 A1 | 3/2009 | McLean |
| 2009/0077638 A1 | 3/2009 | Norman et al. |
| 2009/0083374 A1 | 3/2009 | Saint Clair |
| 2009/0119773 A1 | 5/2009 | D'Amore et al. |
| 2009/0121890 A1 | 5/2009 | Brown et al. |
| 2009/0170532 A1 | 7/2009 | Lee et al. |
| 2009/0172789 A1 | 7/2009 | Band et al. |
| 2009/0178111 A1 | 7/2009 | Moriconi et al. |
| 2009/0187763 A1 | 7/2009 | Freericks et al. |
| 2009/0199178 A1 | 8/2009 | Keller et al. |
| 2009/0199277 A1 | 8/2009 | Norman et al. |
| 2009/0210934 A1 | 8/2009 | Innes |
| 2009/0221278 A1 | 9/2009 | Spelta et al. |
| 2009/0222880 A1 | 9/2009 | Mayer et al. |
| 2009/0228714 A1 | 9/2009 | Fiske et al. |
| 2009/0228954 A1 | 9/2009 | Hu et al. |
| 2009/0228963 A1 | 9/2009 | Pearce et al. |
| 2009/0249359 A1 | 10/2009 | Caunter et al. |
| 2009/0253410 A1 | 10/2009 | Fitzgerald et al. |
| 2009/0253412 A1 | 10/2009 | Sigmund et al. |
| 2009/0265554 A1 | 10/2009 | Robles et al. |
| 2009/0282127 A1 | 11/2009 | Leblanc et al. |
| 2009/0282473 A1 | 11/2009 | Karlson et al. |
| 2009/0323916 A1 | 12/2009 | O'Sullivan et al. |
| 2009/0325615 A1 | 12/2009 | McKay et al. |
| 2009/0327885 A1 | 12/2009 | Aoki et al. |
| 2010/0049874 A1 | 2/2010 | Chene et al. |
| 2010/0050092 A1 | 2/2010 | Williams et al. |
| 2010/0054463 A1 | 3/2010 | Tsan |
| 2010/0058352 A1 | 3/2010 | Esfahany et al. |
| 2010/0064341 A1 | 3/2010 | Aldera |
| 2010/0077469 A1 | 3/2010 | Furman et al. |

(56) References Cited

U.S. PATENT DOCUMENTS

| | | |
|---|---|---|
| 2010/0083358 A1 | 4/2010 | Govindarajan et al. |
| 2010/0100825 A1 | 4/2010 | Sharoni |
| 2010/0100925 A1 | 4/2010 | Hinton |
| 2010/0124196 A1 | 5/2010 | Bonar et al. |
| 2010/0146523 A1 | 6/2010 | Brigaut et al. |
| 2010/0146582 A1 | 6/2010 | Jaber et al. |
| 2010/0150341 A1 | 6/2010 | Dodgson et al. |
| 2010/0154025 A1 | 6/2010 | Esteve Balducci et al. |
| 2010/0162232 A1 | 6/2010 | Bhatia et al. |
| 2010/0173607 A1 | 7/2010 | Thornton et al. |
| 2010/0180346 A1 | 7/2010 | Nicolson et al. |
| 2010/0192212 A1 | 7/2010 | Raleigh |
| 2010/0228825 A1 | 9/2010 | Hegde et al. |
| 2010/0228961 A1 | 9/2010 | Burns et al. |
| 2010/0229197 A1 | 9/2010 | Yi et al. |
| 2010/0235216 A1 | 9/2010 | Hehmeyer et al. |
| 2010/0248699 A1 | 9/2010 | Dumais |
| 2010/0257580 A1 | 10/2010 | Zhao et al. |
| 2010/0269156 A1 | 10/2010 | Hohlfeld et al. |
| 2010/0279652 A1 | 11/2010 | Sharp et al. |
| 2010/0287619 A1 | 11/2010 | Chase |
| 2010/0299152 A1 | 11/2010 | Batchu et al. |
| 2010/0299376 A1 | 11/2010 | Batchu et al. |
| 2010/0317336 A1 | 12/2010 | Ferren et al. |
| 2010/0318992 A1 | 12/2010 | Kushwaha et al. |
| 2010/0319053 A1 | 12/2010 | Gharabally |
| 2010/0325097 A1 | 12/2010 | Er et al. |
| 2010/0331017 A1 | 12/2010 | Ariga |
| 2010/0333165 A1 | 12/2010 | Basak et al. |
| 2011/0030044 A1 | 2/2011 | Kranendonk et al. |
| 2011/0072492 A1 | 3/2011 | Mohler et al. |
| 2011/0145360 A1 | 6/2011 | Sheshagiri et al. |
| 2011/0145833 A1 | 6/2011 | De Los Reyes et al. |
| 2011/0154266 A1 | 6/2011 | Friend et al. |
| 2011/0154477 A1 | 6/2011 | Parla et al. |
| 2011/0154498 A1 | 6/2011 | Fissel et al. |
| 2011/0179484 A1 | 7/2011 | Tuvell et al. |
| 2011/0208797 A1 | 8/2011 | Kim |
| 2011/0208838 A1 | 8/2011 | Thomas et al. |
| 2011/0209064 A1 | 8/2011 | Jorgensen et al. |
| 2011/0209194 A1 | 8/2011 | Kennedy |
| 2011/0219124 A1 | 9/2011 | Allen et al. |
| 2011/0225417 A1 | 9/2011 | Maharajh et al. |
| 2011/0239125 A1 | 9/2011 | Kristensen et al. |
| 2011/0252232 A1 | 10/2011 | De Atley et al. |
| 2011/0252459 A1 | 10/2011 | Walsh et al. |
| 2011/0258301 A1 | 10/2011 | McCormick et al. |
| 2011/0270963 A1 | 11/2011 | Saito et al. |
| 2011/0271279 A1 | 11/2011 | Pate |
| 2011/0276683 A1 | 11/2011 | Goldschlag et al. |
| 2011/0276699 A1 | 11/2011 | Pedersen |
| 2011/0277026 A1 | 11/2011 | Agarwal et al. |
| 2011/0277027 A1 | 11/2011 | Hayton et al. |
| 2011/0283347 A1 | 11/2011 | Bhuta et al. |
| 2011/0295970 A1 | 12/2011 | Miyazawa |
| 2011/0296333 A1 | 12/2011 | Bateman et al. |
| 2011/0314534 A1 | 12/2011 | James |
| 2012/0002813 A1 | 1/2012 | Wei et al. |
| 2012/0005476 A1 | 1/2012 | Wei et al. |
| 2012/0005724 A1 | 1/2012 | Lee |
| 2012/0005745 A1 | 1/2012 | Wei et al. |
| 2012/0005746 A1 | 1/2012 | Wei et al. |
| 2012/0023378 A1 | 1/2012 | Nomura et al. |
| 2012/0023506 A1 | 1/2012 | Maeckel et al. |
| 2012/0023556 A1 | 1/2012 | Schultz et al. |
| 2012/0036347 A1 | 2/2012 | Swanson et al. |
| 2012/0036370 A1 | 2/2012 | Lim et al. |
| 2012/0042036 A1 | 2/2012 | Lau et al. |
| 2012/0052954 A1 | 3/2012 | Zhu et al. |
| 2012/0054853 A1 | 3/2012 | Gupta et al. |
| 2012/0066691 A1 | 3/2012 | Branton |
| 2012/0079475 A1 | 3/2012 | Hicks, III et al. |
| 2012/0079556 A1 | 3/2012 | Wahl |
| 2012/0084184 A1 | 4/2012 | Raleigh et al. |
| 2012/0088540 A1 | 4/2012 | Smith et al. |
| 2012/0096533 A1 | 4/2012 | Boulos et al. |
| 2012/0096544 A1 | 4/2012 | Hosoda |
| 2012/0102195 A1 | 4/2012 | Adams et al. |
| 2012/0109384 A1 | 5/2012 | Stepanian |
| 2012/0110317 A1 | 5/2012 | Scheer et al. |
| 2012/0117622 A1 | 5/2012 | Gronholm et al. |
| 2012/0129503 A1 | 5/2012 | Lindeman et al. |
| 2012/0131116 A1 | 5/2012 | Tu et al. |
| 2012/0131343 A1 | 5/2012 | Choi et al. |
| 2012/0131685 A1 | 5/2012 | Broch et al. |
| 2012/0137364 A1 | 5/2012 | Blaisdell |
| 2012/0151033 A1 | 6/2012 | Baliga et al. |
| 2012/0154265 A1 | 6/2012 | Kim et al. |
| 2012/0154413 A1 | 6/2012 | Kim et al. |
| 2012/0157165 A1 | 6/2012 | Kim et al. |
| 2012/0157166 A1 | 6/2012 | Kim et al. |
| 2012/0159139 A1 | 6/2012 | Kim et al. |
| 2012/0159334 A1 | 6/2012 | Messerly et al. |
| 2012/0165075 A1 | 6/2012 | Kim et al. |
| 2012/0166516 A1 | 6/2012 | Simmons et al. |
| 2012/0166524 A1 | 6/2012 | Watakabe et al. |
| 2012/0166997 A1 | 6/2012 | Cho et al. |
| 2012/0167118 A1 | 6/2012 | Pingili et al. |
| 2012/0167159 A1 | 6/2012 | Mefford, Jr. et al. |
| 2012/0174237 A1 | 7/2012 | Krzyzanowski |
| 2012/0179802 A1 | 7/2012 | Narasimhan et al. |
| 2012/0179909 A1 | 7/2012 | Sagi et al. |
| 2012/0185910 A1 | 7/2012 | Miettinen et al. |
| 2012/0185913 A1 | 7/2012 | Martinez et al. |
| 2012/0191716 A1 | 7/2012 | Omoigui |
| 2012/0192181 A1 | 7/2012 | Gilbert et al. |
| 2012/0198570 A1 | 8/2012 | Joa et al. |
| 2012/0204220 A1 | 8/2012 | Lavi |
| 2012/0209949 A1 | 8/2012 | Deliyannis et al. |
| 2012/0210443 A1 | 8/2012 | Blaisdell et al. |
| 2012/0214472 A1 | 8/2012 | Tadayon et al. |
| 2012/0222120 A1 | 8/2012 | Rim et al. |
| 2012/0233130 A1 | 9/2012 | Vedachalam et al. |
| 2012/0238206 A1 | 9/2012 | Singh et al. |
| 2012/0238257 A1 | 9/2012 | Anson |
| 2012/0240183 A1 | 9/2012 | Sinha |
| 2012/0246191 A1 | 9/2012 | Xiong |
| 2012/0246484 A1 | 9/2012 | Blaisdell et al. |
| 2012/0246731 A1 | 9/2012 | Blaisdell et al. |
| 2012/0250106 A1 | 10/2012 | Kiran Kannambadi et al. |
| 2012/0254768 A1 | 10/2012 | Aggarwal et al. |
| 2012/0255026 A1 | 10/2012 | Baca et al. |
| 2012/0265528 A1 | 10/2012 | Gruber et al. |
| 2012/0265792 A1 | 10/2012 | Salters |
| 2012/0270522 A1 | 10/2012 | Laudermilch et al. |
| 2012/0272221 A1 | 10/2012 | Pessoa et al. |
| 2012/0278454 A1 | 11/2012 | Stewart et al. |
| 2012/0284325 A1 | 11/2012 | Erb |
| 2012/0284779 A1 | 11/2012 | Ingrassia, Jr. et al. |
| 2012/0290694 A9 | 11/2012 | Marl et al. |
| 2012/0291114 A1 | 11/2012 | Poliashenko et al. |
| 2012/0303476 A1 | 11/2012 | Krzyzanowski et al. |
| 2012/0303778 A1 | 11/2012 | Ahiska et al. |
| 2012/0304310 A1 | 11/2012 | Blaisdell |
| 2012/0311154 A1 | 12/2012 | Morgan |
| 2012/0311659 A1 | 12/2012 | Narain et al. |
| 2012/0317185 A1 | 12/2012 | Shah et al. |
| 2012/0321087 A1 | 12/2012 | Fleischman et al. |
| 2012/0324568 A1 | 12/2012 | Wyatt et al. |
| 2012/0331088 A1 | 12/2012 | O'Hare et al. |
| 2012/0331527 A1 | 12/2012 | Walters et al. |
| 2012/0331528 A1 | 12/2012 | Fu et al. |
| 2013/0002725 A1 | 1/2013 | Kim et al. |
| 2013/0007245 A1 | 1/2013 | Malik et al. |
| 2013/0007842 A1 | 1/2013 | Park et al. |
| 2013/0013653 A1 | 1/2013 | Thompson |
| 2013/0013688 A1 | 1/2013 | Wang et al. |
| 2013/0013932 A1 | 1/2013 | Kong et al. |
| 2013/0014239 A1 | 1/2013 | Pieczul et al. |
| 2013/0014267 A1 | 1/2013 | Farrugia et al. |
| 2013/0019013 A1 | 1/2013 | Rice et al. |
| 2013/0019018 A1 | 1/2013 | Rice |
| 2013/0019282 A1 | 1/2013 | Rice et al. |
| 2013/0024424 A1 | 1/2013 | Prahlad et al. |

(56) References Cited

U.S. PATENT DOCUMENTS

| | | |
|---|---|---|
| 2013/0024928 A1 | 1/2013 | Burke et al. |
| 2013/0031544 A1 | 1/2013 | Sridharan et al. |
| 2013/0035063 A1 | 2/2013 | Fisk et al. |
| 2013/0042294 A1 | 2/2013 | Colvin et al. |
| 2013/0042295 A1 | 2/2013 | Kelly et al. |
| 2013/0054922 A1 | 2/2013 | Tuch et al. |
| 2013/0054962 A1 | 2/2013 | Chawla et al. |
| 2013/0055378 A1 | 2/2013 | Chang et al. |
| 2013/0059284 A1 | 3/2013 | Giedgowd, Jr. et al. |
| 2013/0066960 A1 | 3/2013 | Fieremans et al. |
| 2013/0066978 A1 | 3/2013 | Bentley et al. |
| 2013/0067229 A1 | 3/2013 | German et al. |
| 2013/0074142 A1 | 3/2013 | Brennan et al. |
| 2013/0078949 A1 | 3/2013 | Pecen et al. |
| 2013/0084847 A1 | 4/2013 | Tibbitts et al. |
| 2013/0086684 A1 | 4/2013 | Mohler |
| 2013/0088605 A1 | 4/2013 | Quarfordt et al. |
| 2013/0091205 A1 | 4/2013 | Kotler et al. |
| 2013/0091440 A1 | 4/2013 | Kotler et al. |
| 2013/0091543 A1 | 4/2013 | Wade et al. |
| 2013/0095785 A1 | 4/2013 | Sadana et al. |
| 2013/0097296 A1 | 4/2013 | Gehrmann et al. |
| 2013/0097421 A1 | 4/2013 | Lim |
| 2013/0097660 A1 | 4/2013 | Das et al. |
| 2013/0103797 A1 | 4/2013 | Park et al. |
| 2013/0111540 A1 | 5/2013 | Sabin |
| 2013/0117240 A1 | 5/2013 | Taylor et al. |
| 2013/0117563 A1 | 5/2013 | Grabelkovsky |
| 2013/0117805 A1 | 5/2013 | Kent et al. |
| 2013/0117840 A1 | 5/2013 | Roesner et al. |
| 2013/0124673 A1 | 5/2013 | Hjelm et al. |
| 2013/0130651 A1 | 5/2013 | Deasy et al. |
| 2013/0130652 A1 | 5/2013 | Deasy et al. |
| 2013/0130653 A1 | 5/2013 | Deasy et al. |
| 2013/0132457 A1 | 5/2013 | Diwakar |
| 2013/0132941 A1 | 5/2013 | Lindeman et al. |
| 2013/0133043 A1 | 5/2013 | Barkie et al. |
| 2013/0133061 A1 | 5/2013 | Fainkichen et al. |
| 2013/0138766 A1 | 5/2013 | Draluk et al. |
| 2013/0138810 A1 | 5/2013 | Binyamin et al. |
| 2013/0139241 A1 | 5/2013 | Leeder |
| 2013/0142043 A1 | 6/2013 | Tapia et al. |
| 2013/0144934 A1 | 6/2013 | Swett et al. |
| 2013/0145448 A1 | 6/2013 | Newell |
| 2013/0151598 A1 | 6/2013 | Fu et al. |
| 2013/0151681 A1 | 6/2013 | Dournov et al. |
| 2013/0167247 A1 | 6/2013 | Brown et al. |
| 2013/0171967 A1 | 7/2013 | Ashour et al. |
| 2013/0212212 A1 | 8/2013 | Addepalli et al. |
| 2013/0219022 A1 | 8/2013 | Manivel et al. |
| 2013/0219176 A1 | 8/2013 | Akella et al. |
| 2013/0219211 A1 | 8/2013 | Gopinath et al. |
| 2013/0219456 A1 | 8/2013 | Sharma et al. |
| 2013/0227551 A1 | 8/2013 | Tsirkin |
| 2013/0227561 A1 | 8/2013 | Walsh et al. |
| 2013/0227636 A1 | 8/2013 | Bettini et al. |
| 2013/0227659 A1 | 8/2013 | Raleigh |
| 2013/0232541 A1 | 9/2013 | Kapadia et al. |
| 2013/0237152 A1 | 9/2013 | Taggar et al. |
| 2013/0254262 A1 | 9/2013 | Udall |
| 2013/0254660 A1 | 9/2013 | Fujioka |
| 2013/0254831 A1 | 9/2013 | Roach et al. |
| 2013/0260730 A1 | 10/2013 | Toy et al. |
| 2013/0263208 A1 | 10/2013 | Challa |
| 2013/0263209 A1 | 10/2013 | Panuganty |
| 2013/0268676 A1 | 10/2013 | Martins et al. |
| 2013/0283335 A1 | 10/2013 | Lakshminarayanan et al. |
| 2013/0288656 A1 | 10/2013 | Schultz et al. |
| 2013/0290709 A1 | 10/2013 | Muppidi et al. |
| 2013/0291052 A1 | 10/2013 | Hadar et al. |
| 2013/0291055 A1 | 10/2013 | Muppidi et al. |
| 2013/0297604 A1 | 11/2013 | Sutedja et al. |
| 2013/0297662 A1 | 11/2013 | Sharma et al. |
| 2013/0298185 A1 | 11/2013 | Koneru et al. |
| 2013/0298201 A1 | 11/2013 | Aravindakshan et al. |
| 2013/0298242 A1 | 11/2013 | Kumar et al. |
| 2013/0303194 A1 | 11/2013 | Rowles |
| 2013/0311593 A1 | 11/2013 | Prince et al. |
| 2013/0311597 A1 | 11/2013 | Arrouye et al. |
| 2013/0318345 A1 | 11/2013 | Hengeveld |
| 2013/0333005 A1 | 12/2013 | Kim et al. |
| 2013/0346268 A1 | 12/2013 | Pereira et al. |
| 2013/0347130 A1 | 12/2013 | Sima |
| 2014/0006347 A1 | 1/2014 | Qureshi et al. |
| 2014/0006512 A1 | 1/2014 | Huang et al. |
| 2014/0007183 A1 | 1/2014 | Qureshi et al. |
| 2014/0007214 A1 | 1/2014 | Qureshi et al. |
| 2014/0007215 A1 | 1/2014 | Romano et al. |
| 2014/0007222 A1 | 1/2014 | Qureshi et al. |
| 2014/0020062 A1 | 1/2014 | Tumula et al. |
| 2014/0020073 A1 | 1/2014 | Ronda et al. |
| 2014/0032691 A1 | 1/2014 | Barton et al. |
| 2014/0032733 A1 | 1/2014 | Barton et al. |
| 2014/0032758 A1 | 1/2014 | Barton et al. |
| 2014/0032759 A1 | 1/2014 | Barton et al. |
| 2014/0033271 A1 | 1/2014 | Barton et al. |
| 2014/0040638 A1 | 2/2014 | Barton et al. |
| 2014/0040656 A1 | 2/2014 | Ho et al. |
| 2014/0040977 A1 | 2/2014 | Barton et al. |
| 2014/0040978 A1 | 2/2014 | Barton et al. |
| 2014/0040979 A1 | 2/2014 | Barton et al. |
| 2014/0047413 A1 | 2/2014 | Sheive et al. |
| 2014/0047535 A1 | 2/2014 | Parla et al. |
| 2014/0059640 A9 | 2/2014 | Raleigh et al. |
| 2014/0059642 A1 | 2/2014 | Deasy et al. |
| 2014/0096199 A1 | 4/2014 | Dave et al. |
| 2014/0108649 A1 | 4/2014 | Barton et al. |
| 2014/0109072 A1 | 4/2014 | Lang et al. |
| 2014/0109078 A1 | 4/2014 | Lang et al. |
| 2014/0111316 A1 | 4/2014 | Kim |
| 2014/0130174 A1 | 5/2014 | Celi, Jr. et al. |
| 2014/0149599 A1 | 5/2014 | Krishna et al. |
| 2014/0162614 A1 | 6/2014 | Lindeman et al. |
| 2014/0173700 A1 | 6/2014 | Awan et al. |
| 2014/0181803 A1 | 6/2014 | Cooper et al. |
| 2014/0181934 A1 | 6/2014 | Mayblum et al. |
| 2014/0189808 A1 | 7/2014 | Mahaffey et al. |
| 2014/0283030 A1 | 9/2014 | Moore et al. |
| 2014/0298401 A1 | 10/2014 | Batson et al. |
| 2014/0315536 A1 | 10/2014 | Chow et al. |
| 2015/0026827 A1 | 1/2015 | Kao et al. |
| 2015/0087270 A1 | 3/2015 | Richardson et al. |
| 2017/0244724 A1 | 8/2017 | Deasy et al. |

FOREIGN PATENT DOCUMENTS

| | | |
|---|---|---|
| CN | 1661610 A | 8/2005 |
| CN | 1708751 A | 12/2005 |
| CN | 1713199 A | 12/2005 |
| CN | 1849774 A | 10/2006 |
| CN | 1951060 A | 4/2007 |
| CN | 101170401 A | 4/2008 |
| CN | 101305378 A | 11/2008 |
| CN | 101350814 A | 1/2009 |
| CN | 101453708 A | 6/2009 |
| CN | 101572678 A | 11/2009 |
| CN | 101588353 A | 11/2009 |
| CN | 101888597 A | 11/2010 |
| CN | 102422553 A | 4/2012 |
| CN | 102541635 A | 7/2012 |
| CN | 102591802 A | 7/2012 |
| CN | 102986190 A | 3/2013 |
| CN | 104854561 A | 8/2015 |
| EP | 1465039 A1 | 10/2004 |
| EP | 2403211 A1 | 1/2012 |
| EP | 2428894 A1 | 3/2012 |
| EP | 2523107 A1 | 11/2012 |
| GB | 2411320 A | 8/2005 |
| GB | 2462442 A | 2/2010 |
| JP | 11-205380 | 7/1999 |
| JP | 2003-296210 A | 10/2003 |
| JP | 2006-094258 A | 4/2006 |
| JP | 2006155522 A | 6/2006 |
| JP | 2007215201 A | 8/2007 |

(56) References Cited

FOREIGN PATENT DOCUMENTS

| | | | |
|---|---|---|---|
| JP | 2008-033751 A | 2/2008 | |
| JP | 2008-097419 A | 4/2008 | |
| JP | 2008-160753 A | 7/2008 | |
| JP | 2008-527574 A | 7/2008 | |
| JP | 2009-070073 A | 4/2009 | |
| JP | 2009-289164 A | 12/2009 | |
| JP | 2010-015601 A | 1/2010 | |
| JP | 2011-248888 A | 12/2011 | |
| KR | 10-0806993 B1 | 2/2008 | |
| KR | 2012-0118819 A | 10/2012 | |
| NO | 2009021200 A1 | 2/2009 | |
| NO | 2010054258 A1 | 5/2010 | |
| WO | 9914652 A1 | 3/1999 | |
| WO | 02084460 A2 | 10/2002 | |
| WO | 2004107646 A1 | 12/2004 | |
| WO | 2007113709 A1 | 10/2007 | |
| WO | 2008086611 A1 | 7/2008 | |
| WO | 2010115289 A1 | 10/2010 | |

OTHER PUBLICATIONS

Dec. 13, 2005—Lowe, "Application-Specific VPNs".

Nov. 26, 2013—International Search Report and Written Opinion in International Application No. PCT/US2013/060388.

Apr. 2012—Xuetao Wei, et al., "Malicious Android Applications in the Enterprise: What Do They Do and How Do We Fix It?,"? ICDE Workshop on Secure Data Management on Smartphones and Mobiles, 4 pages.

2012—Ranjan et al., "Programming Cloud Resource Orchestration Framework: Operations and Research Challenges", arvix.org, pp. 1-19.

2010—Na et al., "Personal Cloud Computing Security Framework," 2010 IEEE Asia-Pacific Computing Conference, pp. 671-675.

2003—Wilson et al., "Unified Security Framework", in proceedings of the 1st International Symposium on Information and Communication Technologies, pp. 500-505. Trinity College Dublin.

2003—Mysore et al., "The Liquid Media System—a Multi-Device Streaming Media Orchestration Framework", Ubicomp 2003 Workshop, pp. 1-4.

Jan. 10, 2014—(PCT) Written Opinion and International Search Report, PCT/US2013/062636.

Nov. 5, 2015—(EP) Office Action—App 13773923.1.

Aug. 1, 2012—"TPS Development Using the Microsoft .NET Framework", Teresa P. Lopes, IEEE Instrumentation & Measurement Magazine (vol. 15, No. 4).

Apr. 28, 2003—Kate Gregory: "Managed, Unmanaged, Native: What Kind of Code is This?", Developer.com, pp. 1-3, XP055096991, retrieved from the Internet: <URL:http://www.developer.com/print.php/2197621>, [retrieved on Jan. 17, 2014], the whole document.

Feb. 10, 2014—(PCT) Search Report—App PCT/US/2013/065245.

Mar. 25, 2016—(CN) Office Action—App 201380057326.1.

2005—Hamed, H. et al., "Modeling and verification of IPSec and VPN security policies," 13th IEEE International Conference on Network Protocols (ICNP'05), pp. 10.

Nov. 2004—Skarmeta, A. et al., "Policy-based dynamic provision of IP services in a secure VPN coalition scenario," in IEEE Communications Magazine, vol. 42, No. 11, pp. 118-124.

Jun. 20, 2016—(EP) Extended European Search Report—App 13795317.

Nov. 13, 2015—International Search Report and Written Opinion of International Application No. PCT/US2015/026781.

Mar. 11, 2008—Vejda, T. et al., "Towards Trust Services for Language-Based Virtual Machines for Grid Computing," Trusted Computing—Challenges and Applications, ISBN: 978-3-540-68978-2.

Jul. 7, 2016—(EP) Supplementary European Search Report—App 13795317.0.

Feb. 4, 2014—International Search Report and Written Opinion in Application No. PCT/US2013/064349.

Jan. 21, 2014—International Search Report and Written Opinion in International Application No. PCT/US2013/063856.

Jan. 2013—Apple Inc., iPad User Guide for iOS 6.1 Software, Chapter 26, Accessibility, pp. 107-108.

Feb. 24, 2014—(PCT) International Search Report and Written Opinion—App PCT/US2013/060379.

Mar. 6, 2014—International Search Report and Written Opinion in International Application No. PCT/US2013/064319.

Feb. 6, 2014—International Search Report and Written opinion in International Application No. PCT/US2013/064076.

Mar. 17, 2014—International Search Report and Written Opinion in International Application No. PCT/US2013/064279.

Apr. 4, 2014—International Search Report and Written Opinion in International Application No. PCT/US2013/063429.

Jul. 31, 2012—"Citrix XenMobile Technology Overview: White Paper," Citrix White Papers online, pp. 1-14; retrieved from http://insight.com/content/aam/insight/en_US/pdfs/citrix/xenmobile-tech-overview.pdf, retrieved Jan. 27, 2014.

Jun. 3, 2014—Search Report and Written Opinion issued in International Application No. PCT/US2013/060047.

Jul. 1, 2011—Wright et al., "Your Firm's Mobile Devices: How Secure are They?" Journal of Corporate Accounting and Finance, Willey Periodicals. pp. 13-21.

Oct. 25, 2010—Andreas, "Digging into the Exchange ActiveSync Protocol," Mobility Dojo.net, http://mobilitydojo.net/2010/03/17/digging-into-the-exchange-activesync-protocol/.

Oct. 20, 2014—(PCT) International Search Report—App PCT/US2014/036382.

Sep. 29, 2014—(PCT) International Search Report—App PCT/US2014/036326.

Dec. 20, 2013—(PCT) International Search Report and Written Opinion—App PCT/US2013/063363.

Jul. 11, 2014—(PCT) Written Opinion and International Search Report—App PCT/US13/63261.

2011—Laverty, Joseph Packy et al., "Comparative Analysis of Mobile Application Development and Security Models," Issues in Information Systems vol. XII, No. 1, [Retrieved from the Internet] <http://iacis.org/iis/2011/301-312_AL2011_1694.pdf> pp. 301-312.

2012—Potharaju, Rahul et al., "Plagiarizing smartphone applications: attack strategies and defense techniques," [Online] Engineering Secure Software and Systems, Springer Berlin Heidelberg, [Retrieved from the Internet] <http://link.springer.com/chapter/10.1007/978-3-642-28166-2_11#> pp. 106-120.

1998—Peine, H., "Security concepts and implementation in the Ara mobile agent system," [Online] 1998, Enabling Technologies: Infrastructure for Collaborative Enterprises, Seventh IEEE International Workshops on Jun. 17-19, 1998, [Retrieved from the Internet] <http://ieeexplore.ieee.org/stamp/stamp.jsp?tp=&arnumber=725699&isnumber=15665> pp. 236-242.

2006—Shah et al., "Securing Java-Based Mobile Agents through Byte Code Obfuscation Techniques," [Online] Dec. 23-24, 2006, Multitopic Conference, 2006, INMIC '06. IEEE, [Retrieved from the Internet] <http://ieeexplore.ieee.org/stamp/stamp.jsp?tp=&arnumber=4196425&isnumber=414013> pp. 305-308.

2008—Administration Guide for Symantec Endpoint Protection and Symantec Network Access Control; Retrieved from the Internet <<URL:ftp.symantec.com/public/english_us_canada/products/symantec_endpoint_protection/11.0/ manuals/administration_guide.pdf>; pp. 1-615.

2007—Symantec Network Access Control Enforcer Implementation Guide; Retrieved from the Internet <URl:ftp.symantec.com/public/english_us_canada/products/symantec_network_access_control/11.0/manuals/enforcer_implementation_guide.pdf>; pp. 1-132.

Jul. 29, 2016 (KR) Office Action—App. 10-2015-7031152.

Symantec: "What are Managed Applications and What is the Difference Between Assigned and Published;" Jan. 7, 2002; pp. 1-5.

Tilakgovind: "Understanding the Difference Between .exe and .msi: Symantec Connect;" Jan. 15, 2008.

Oct. 11, 2016—International Search Report and Written Opinion—App No. PCT/US2016/039229.

Nov. 1, 2016 (KR) Office Action—App. 10-2012-7001062.

(56) References Cited

OTHER PUBLICATIONS

Oct. 28, 2016 (JP) Notice of Reasons for Refusal—App. 2016-505458.
Oct. 28, 2016 (JP) Notification of Reason for Refusal—App. 2016-505457.
Oct. 14, 2016—(KR) Office Action—App 10-2015-7031149.
Feb. 21, 2017—(CN) First Chinese Office Action—App. 2013800657267, Machine Eng Tran.
Feb. 8, 2017—(CN) First Office Action—App No. 201380064191.1—Eng Trans.
May 24, 2017—U.S. Non-final Office Action—U.S. Appl. No. 14/932,293.
May 3, 2017 (CN) Decision of Rejection—App 2013800573261.
May 31, 2017 (CN) First Office Action—App. 201380077065.X.
Jun. 1, 2017—U.S. Final Office Action—U.S. Appl. No. 13/963,833.
Jun. 1, 2017 —U.S. Final Office Action—U.S. Appl. No. 13/963,833.
Jun. 5, 2017—U.S. Non-Final Office Action—U.S. Appl. No. 14/733,490.
Jun. 28, 2017—U.S. Final Office Action—U.S. Appl. No. 14/752,132.
Jun. 14, 2017 (KR) Korean Intellectual Property Office Notice to Submit a Response—App. 10-2015-7031148.
Jun. 9, 2017—(CN) First Office Action—App 2013800627647.
Jul. 7, 2017—U.S. Non-final Office Action—U.S. Appl. No. 14/875,450.
Jul. 17, 2017—U.S. Final Office Action—U.S. Appl. No. 14/876,832.
Aug. 3, 2017—(JP) Office Action—App 2016-512957.
Ikuki Matsuhisa, Telecommunication, RIC Telecom, Sep. 25, 2011, vol. 28, No. 10, p. 66-69.
Sep. 22, 2017—(US) Non-final Office Action—U.S. Appl. No. 14/055,038.
Oct. 3, 2017—(US) Non-final Office Action—U.S. Appl. No. 15/057,314.

CONTROLLING MOBILE DEVICE ACCESS TO SECURE DATA

CROSS-REFERENCE TO RELATED APPLICATIONS

This application is a continuation of and claims priority to U.S. Non-Provisional application Ser. No. 14/607,593, filed Jan. 28, 2015, and entitled "CONTROLLING MOBILE DEVICE ACCESS TO SECURE DATA;" which claims priority to U.S. Non-Provisional application Ser. No. 14/041,911, filed Sep. 30, 2013 (now U.S. Pat. No. 8,959,579), and entitled "CONTROLLING MOBILE DEVICE ACCESS TO SECURE DATA;" which claims priority to U.S. Non-Provisional patent application Ser. No. 14/039,632, filed Sep. 27, 2013, and entitled "CONTROLLING MOBILE DEVICE ACCESS TO SECURE DATA," and the following provisional applications: U.S. Provisional Patent Application Ser. No. 61/861,910, filed Aug. 2, 2013, and entitled "CONTROLLING MOBILE DEVICE ACCESS TO SECURE DATA;" U.S. Provisional Patent Application Ser. No. 61/714,293, filed Oct. 16, 2012, and entitled "MANAGING ENCRYPTED DATA VAULTS FOR MANAGED APPLICATIONS ON UNMANAGED MOBILE DEVICE;" and U.S. Provisional Patent Application Ser. No. 61/806,577, filed Mar. 29, 2013, and entitled "SYSTEMS AND METHODS FOR ENTERPRISE MOBILITY MANAGEMENT."

Each of the above-mentioned patent applications is incorporated by reference herein in its entirety.

BACKGROUND

Aspects of the disclosure relate to computer hardware and software. In particular, one or more aspects of the disclosure generally relate to computer hardware and software for providing an enterprise application store.

Increasingly, corporations and other organizations are providing and/or otherwise enabling their employees and other associates with mobile devices, such as smart phones, tablet computers, and other mobile computing devices. As these devices continue to grow in popularity and provide an increasing number of functions, many organizations may wish to place certain controls on how these devices can be used, what resources these devices can access, and how the applications running on these devices can interact with other resources.

SUMMARY

Aspects of the disclosure provide more efficient, effective, functional, and convenient ways of controlling how mobile devices can be used, what resources mobile devices can access, and how the applications running on these devices can interact with other resources. In particular, in one or more embodiments discussed in greater detail below, an enterprise application store may be implemented that can provide these and features.

Various aspects of the disclosure relate to providing secure containers or data vaults for data of one or more managed applications. In some embodiments, each managed application may be assigned its own private data vault and/or may be assigned a shared data vault that is accessible to at least one other managed application. As the managed application executes, calls for access to the data may be intercepted and redirected to the secure containers. Data stored in a secure container may be encrypted according to a policy.

Other aspects relate to deleting data from a secure container, such as via a selective wipe of data associated with a managed application. For example, some aspects relate to a mobile device intercepting a read or write operation from a managed application executing on the mobile device; accessing, based on the read or write operation, a secure container that is a logical interface into which read or write operations are redirected and in which data is in an encrypted form; determining to perform a selective wipe of data associated with the managed application; and deleting encrypted data from the secure container.

Additional aspects relate to creating or otherwise configuring a secure container. For example, some aspects relate to a mobile device obtaining policy information via an access gateway through which a resource required by a managed application is accessible, wherein the policy information defines a secure container to be used when the managed application is executing; obtaining key information via the access gateway, wherein the key information includes one or more keys for encrypting or decrypting data of the secure container; configuring the secure container based on the policy information, wherein the secure container is a logical interface into which read or write operations are redirected and in which data is in an encrypted form; intercepting a read or write operation from the managed application while the managed application is executing on the mobile device; and accessing, based on the read or write operation, the secure container.

Further aspects relate to receiving key information required to encrypt/decrypt the data stored in the secure containers. For example, some aspects relate to a mobile device transmitting a message to an access gateway through which a resource required by a managed application is accessible, wherein the message is in connection with an authorization process for accessing said resource; receiving key information via the access gateway, wherein the key information includes one or more keys for encrypting or decrypting data of a secure container that is a logical interface into which read or write operations are redirected and in which data is in an encrypted form; intercepting a read or write operation from the managed application while the managed application is executing on the mobile device; and accessing, based on the read or write operation and the one or more keys, the secure container.

Yet further aspects relate to publishing the managed applications, policy information and key information for download to a mobile device. For example, some aspects relate to one or more computing devices determining, for a managed application that is to be made accessible for installing on one or more mobile devices, policy information that defines one or more secure containers to be used when the managed application is executing; determining key information that includes one or more keys for encrypting or decrypting data of the one or more secure containers; publishing the managed application, policy information and key information such that all are accessible for installing on the one or more mobile devices; and transmitting the managed application, policy information and key information to a mobile device.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, various aspects of the disclosure relate to providing secure containers or data vaults for data of one or more managed applications. In some embodiments, each managed application may be assigned its own private data vault and/or may be assigned a shared data vault that is accessible to at least one other managed application. As the managed application executes, calls for access to the data may be intercepted and redirected to the secure containers. Data stored in a secure container may be encrypted according to a policy that may be set by an enterprise. Accordingly, data retrieved from the secure containers may need to be decrypted prior to forwarding to the application. Other aspects relate to deleting data from a secure container, such as via a selective wipe of data associated with a managed application (e.g., when the managed application is uninstalled or when mobile device is operated in violation the enterprise's policy). Further aspects relate to configuring and creating the secure containers, retrieving key information required to encrypt/decrypt the data stored in the secure containers, and publishing the managed applications, policy information and key information for download to a mobile device (e.g., in an application store).

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Computing Architecture

Figure 1:
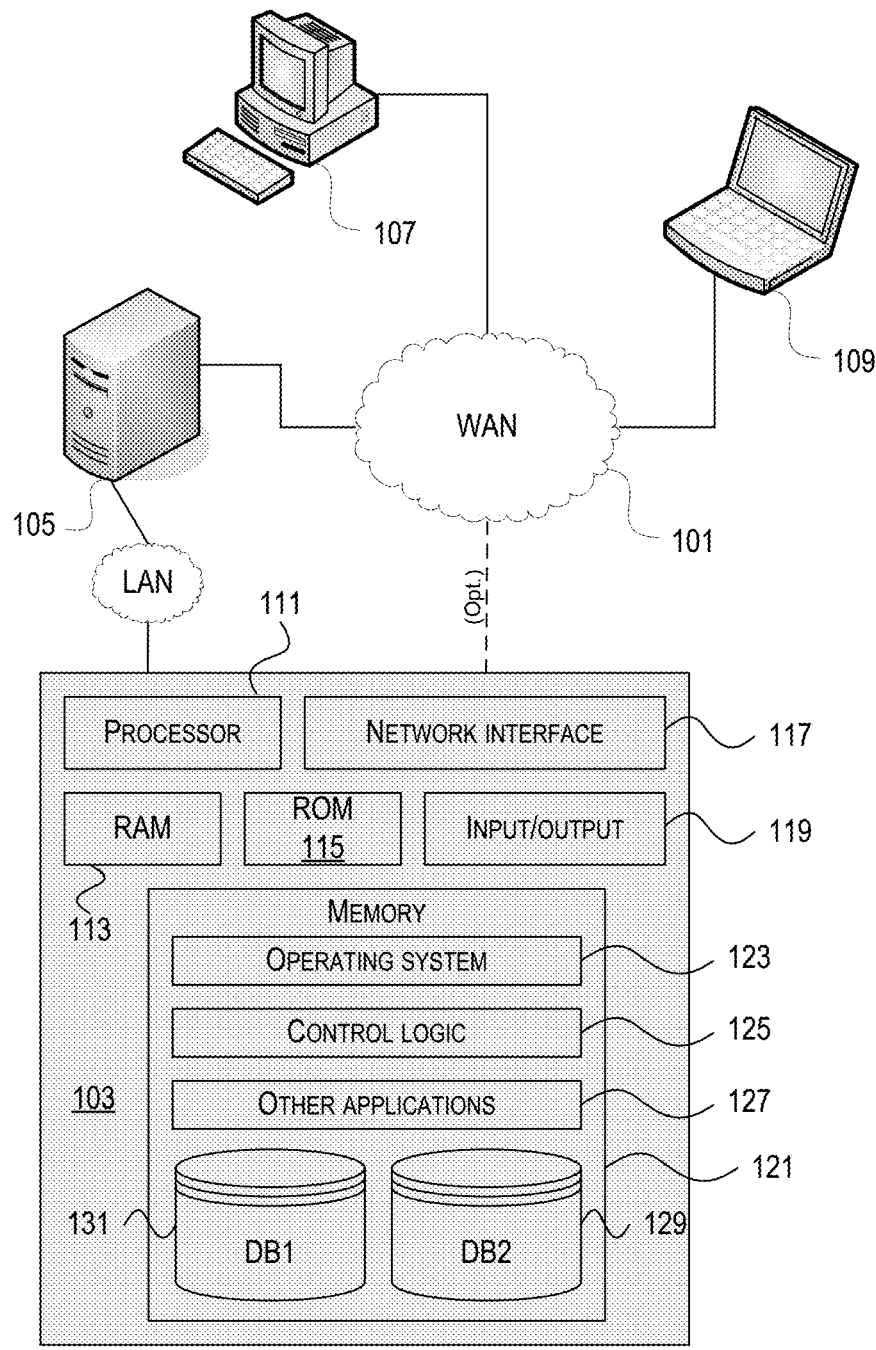
FIG. 1 depicts an illustrative computer system architecture that may be used in accordance with one or more aspects of the disclosure.

Computer software, hardware, and networks may be utilized in a variety of different system environments, including standalone, networked, remote-access (aka, remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, LANs, metropolitan area networks (MAN) wireless networks, personal networks (PAN), and the like. Network 101 is for illustration purposes and may be replaced with fewer or additional computer networks. A local area network (LAN) may have one or more of any known LAN topology and may use one or more of a variety of different protocols, such as Ethernet. Devices 103, 105, 107, 109 and other devices (not shown) may be connected to one or more of the networks via twisted pair wires, coaxial cable, fiber optics, radio waves or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the rate server 103. Data server 103 may further include RAM 113, ROM 115, network interface 117, input/output interfaces 119 (e.g., keyboard, mouse, display, printer, etc.), and memory 121. I/O 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database may include the second database (e.g., as a separate table, report, etc.). That is, the information can be stored in a single database, or separated into different logical, virtual, or physical databases, depending on system design. Devices 105, 107, 109 may have similar or different architecture as described with respect to device 103. Those of skill in the art will appreciate that the functionality of data processing device 103 (or device 105, 107, 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
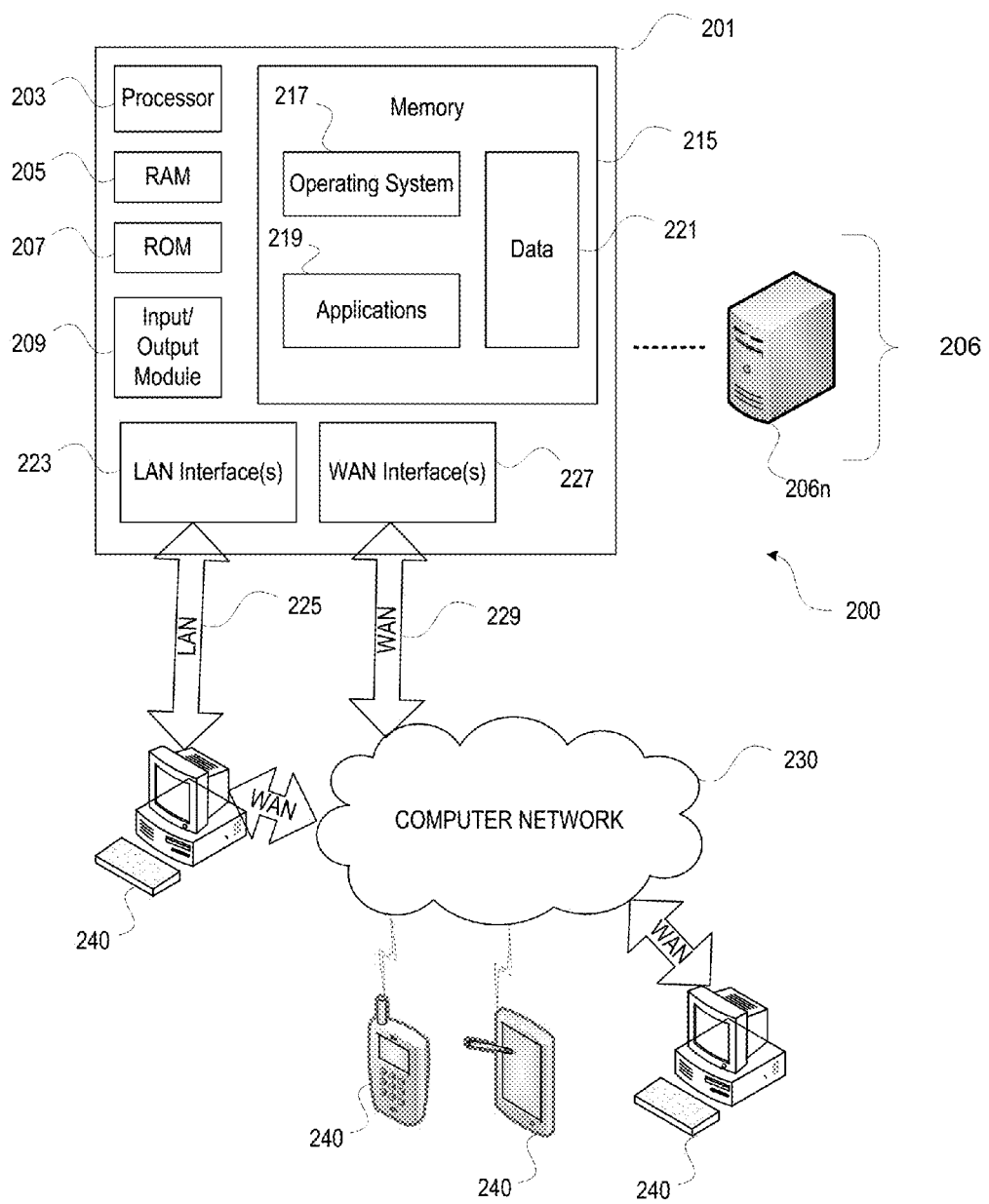
FIG. 2 depicts an illustrative remote-access system architecture that may be used in accordance with various aspects of the disclosure.

With further reference to FIG. 2, one or more aspects described herein may be implemented in a remote-access environment. FIG. 2 depicts an example system architecture including a generic computing device 201 in an illustrative computing environment 200 that may be used according to one or more illustrative aspects described herein. Generic computing device 201 may be used as a server 206a in a single-server or multi-server desktop virtualization system (e.g., a remote access or cloud system) configured to provide virtual machines for client access devices. The generic computing device 201 may have a processor 203 for controlling overall operation of the server and its associated components, including random access memory (RAM) 205, read-only memory (ROM) 207, input/output (I/O) module 209, and memory 215.

I/O module 209 may include a mouse, keypad, touch screen, scanner, optical reader, and/or stylus (or other input device(s)) through which a user of generic computing device 201 may provide input, and may also include one or more of a speaker for providing audio output and a video display device for providing textual, audiovisual, and/or graphical output. Software may be stored within memory 215 and/or other storage to provide instructions to processor 203 for configuring generic computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices). The terminals 240 may be personal computers, mobile devices, laptop computers, tablets, or servers that include many or all of the elements described above with respect to the generic computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem 227 or other wide area network interface for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, PDAs, notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while and logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, SYMBIAN, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a SSL VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 106a that receives requests from a client machine 240, forwards the request to a second server 106b, and responds to the request generated by the client machine 240 with a response from the second server 106b. First server 106a may acquire an enumeration of applications available to the client machine 240 and well as address information associated with an application server 206 hosting an application identified within the enumeration of applications. First server 106a can then present a response to the client's request using a web interface, and communicate directly with the client 240 to provide the client 240 with access to an identified application. One or more clients 240 and/or one or more servers 206 may transmit data over network 230, e.g., network 101.

FIG. 2 shows a high-level architecture of an illustrative desktop virtualization system. As shown, the desktop virtualization system may be single-server or multi-server system, or cloud system, including at least one virtualization server 206 configured to provide virtual desktops and/or virtual applications to one or more client access devices 240. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

Figure 3:
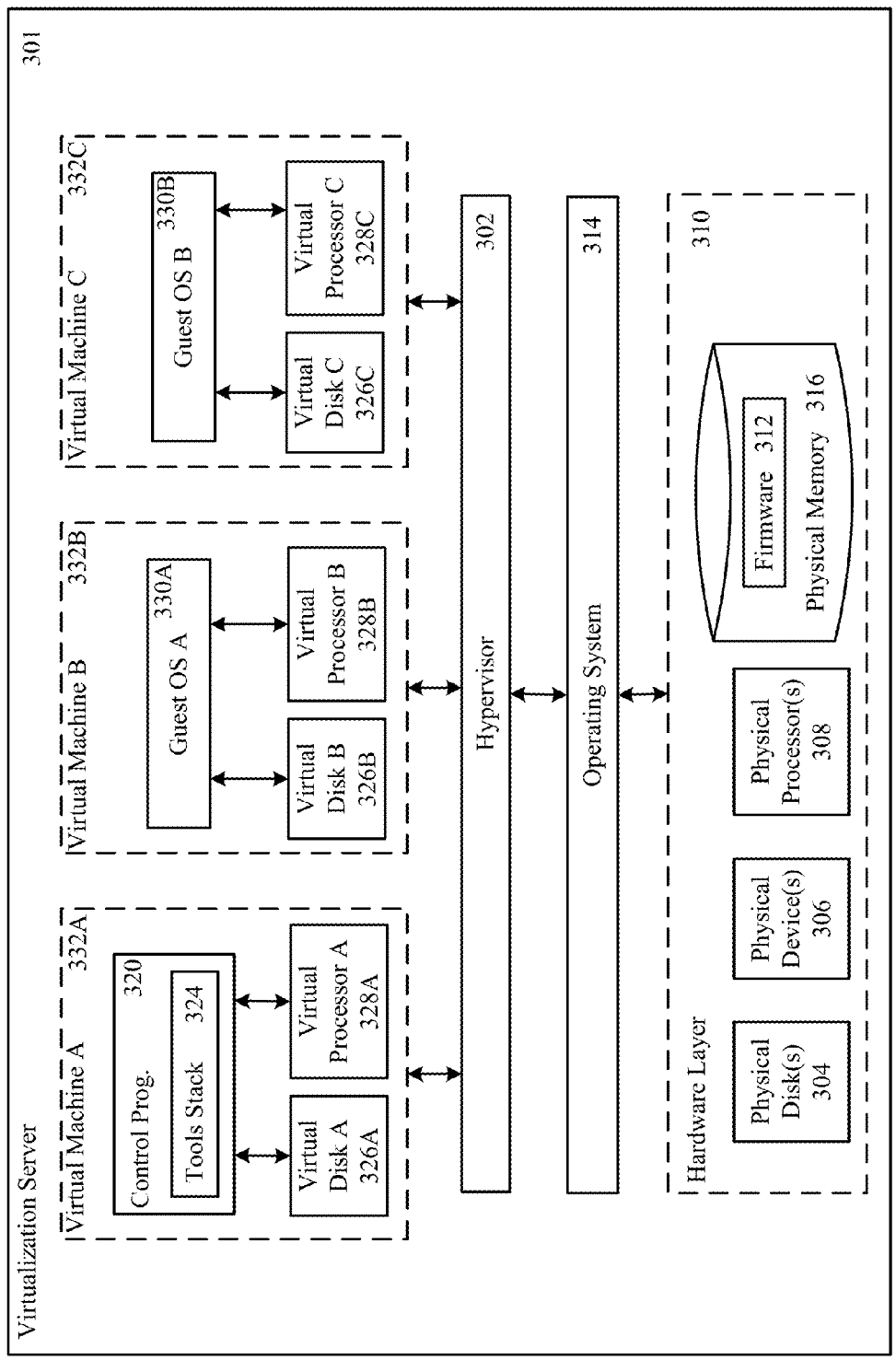
FIG. 3 depicts an illustrative virtualized (hypervisor) system architecture that may be used in accordance one or more aspects of the disclosure.

With further reference to FIG. 3, a computer device 301 may be configured as a virtualization server in a virtualization environment, for example, a single-server, multi-server, or cloud computing environment. Virtualization server 301 illustrated in FIG. 3 can be deployed as and/or implemented by one or more embodiments of the server 206 illustrated in FIG. 2 or by other known computing devices. Included in virtualization server 301 is a hardware layer that can include one or more physical disks 304, one or more physical devices 306, one or more physical processors 308 and one or more physical memories 316. In some embodiments, firmware 312 can be stored within a memory element in the physical memory 316 and can be executed by one or more of the physical processors 308. Virtualization server 301 may further include an operating system 314 that may be stored in a memory element in the physical memory 316 and executed by one or more of the physical processors 308. Still further, a hypervisor 302 may be stored in a memory element in the physical memory 316 and can be executed by one or more of the physical processors 308.

Executing on one or more of the physical processors 308 may be one or more virtual machines 332A-C (generally 332). Each virtual machine 332 may have a virtual disk 326A-C and a virtual processor 328A-C. In some embodiments, a first virtual machine 332A may execute, using a virtual processor 328A, a control program 320 that includes a tools stack 324. Control program 320 may be referred to as a control virtual machine, Dom0, Domain 0, or other virtual machine used for system administration and/or control. In some embodiments, one or more virtual machines 332B-C can execute, using a virtual processor 328B-C, a guest operating system 330A-B.

Virtualization server 301 may include a hardware layer 310 with one or more pieces of hardware that communicate with the virtualization server 301. In some embodiments, the hardware layer 310 can include one or more physical disks 304, one or more physical devices 306, one or more physical processors 308, and one or more memory 216. Physical components 304, 306, 308, and 316 may include, for example, any of the components described above. Physical devices 306 may include, for example, a network interface card, a video card, a keyboard, a mouse, an input device, a monitor, a display device, speakers, an optical drive, a storage device, a universal serial bus connection, a printer, a scanner, a network element (e.g., router, firewall, network address translator, load balancer, virtual private network (VPN) gateway, Dynamic Host Configuration Protocol (DHCP) router, etc.), or any device connected to or communicating with virtualization server 301. Physical memory 316 in the hardware layer 310 may include any type of memory. Physical memory 316 may store data, and in some embodiments may store one or more programs, or set of executable instructions. FIG. 3 illustrates an embodiment where firmware 312 is stored within the physical memory 316 of virtualization server 301. Programs or executable instructions stored in the physical memory 316 can be executed by the one or more processors 308 of virtualization server 301.

Virtualization server 301 may also include a hypervisor 302. In some embodiments, hypervisor 302 may be a program executed by processors 308 on virtualization server 301 to create and manage any number of virtual machines 332. Hypervisor 302 may be referred to as a virtual machine monitor, or platform virtualization software. In some embodiments, hypervisor 302 can be any combination of executable instructions and hardware that monitors virtual machines executing on a computing machine. Hypervisor 302 may be Type 2 hypervisor, where the hypervisor that executes within an operating system 314 executing on the virtualization server 301. Virtual machines then execute at a level above the hypervisor. In some embodiments, the Type 2 hypervisor executes within the context of a user's operating system such that the Type 2 hypervisor interacts with the user's operating system. In other embodiments, one or more virtualization servers 201 in a virtualization environment may instead include a Type 1 hypervisor (not shown). A Type 1 hypervisor may execute on the virtualization server 301 by directly accessing the hardware and resources within the hardware layer 310. That is, while a Type 2 hypervisor 302 accesses system resources through a host operating system 314, as shown, a Type 1 hypervisor may directly access all system resources without the host operating system 314. A Type 1 hypervisor may execute directly on one or more physical processors 308 of virtualization server 301, and may include program data stored in the physical memory 316.

Hypervisor 302, in some embodiments, can provide virtual resources to operating systems 330 or control programs 320 executing on virtual machines 332 in any manner that simulates the operating systems 330 or control programs 320 having direct access to system resources. System resources can include, but are not limited to, physical devices 306, physical disks 304, physical processors 308, physical memory 316 and any other component included in virtualization server 301 hardware layer 310. Hypervisor 302 may be used to emulate virtual hardware, partition physical hardware, virtualize physical hardware, and/or execute virtual machines that provide access to computing environments. In still other embodiments, hypervisor 302 controls processor scheduling and memory partitioning for a virtual machine 332 executing on virtualization server 301. Hypervisor 302 may include those manufactured by VMWare, Inc., of Palo Alto, Calif.; the XEN hypervisor, an open source product whose development is overseen by the open source Xen.org community; HyperV, VirtualServer or virtual PC hypervisors provided by Microsoft, or others. In some embodiments, virtualization server 301 executes a hypervisor 302 that creates a virtual machine platform on which guest operating systems may execute. In these embodiments, the virtualization server 301 may be referred to as a host server. An example of such a virtualization server is the XEN SERVER provided by Citrix Systems, Inc., of Fort Lauderdale, Fla.

Hypervisor 302 may create one or more virtual machines 332B-C (generally 332) in which guest operating systems 330 execute. In some embodiments, hypervisor 302 may load a virtual machine image to create a virtual machine 332.

In other embodiments, the hypervisor 302 may executes a guest operating system 330 within virtual machine 332. In still other embodiments, virtual machine 332 may execute guest operating system 330.

In addition to creating virtual machines 332, hypervisor 302 may control the execution of at least one virtual machine 332. In other embodiments, hypervisor 302 may presents at least one virtual machine 332 with an abstraction of at least one hardware resource provided by the virtualization server 301 (e.g., any hardware resource available within the hardware layer 310). In other embodiments, hypervisor 302 may control the manner in which virtual machines 332 access physical processors 308 available in virtualization server 301. Controlling access to physical processors 308 may include determining whether a virtual machine 332 should have access to a processor 308, and how physical processor capabilities are presented to the virtual machine 332.

As shown in FIG. 3, virtualization server 301 may host or execute one or more virtual machines 332. A virtual machine 332 is a set of executable instructions that, when executed by a processor 308, imitate the operation of a physical computer such that the virtual machine 332 can execute programs and processes much like a physical computing device. While FIG. 3 illustrates an embodiment where a virtualization server 301 hosts three virtual machines 332, in other embodiments virtualization server 301 can host any number of virtual machines 332. Hypervisor 302, in some embodiments, provides each virtual machine 332 with a unique virtual view of the physical hardware, memory, processor and other system resources available to that virtual machine 332. In some embodiments, the unique virtual view can be based on one or more of virtual machine permissions, application of a policy engine to one or more virtual machine identifiers, a user accessing a virtual machine, the applications executing on a virtual machine, networks accessed by a virtual machine, or any other desired criteria. For instance, hypervisor 302 may create one or more unsecure virtual machines 332 and one or more secure virtual machines 332. Unsecure virtual machines 332 may be prevented from accessing resources, hardware, memory locations, and programs that secure virtual machines 332 may be permitted to access. In other embodiments, hypervisor 302 may provide each virtual machine 332 with a substantially similar virtual view of the physical hardware, memory, processor and other system resources available to the virtual machines 332.

Each virtual machine 332 may include a virtual disk 326A-C (generally 326) and a virtual processor 328A-C (generally 328.) The virtual disk 326, in some embodiments, is a virtualized view of one or more physical disks 304 of the virtualization server 301, or a portion of one or more physical disks 304 of the virtualization server 301. The virtualized view of the physical disks 304 can be generated, provided and managed by the hypervisor 302. In some embodiments, hypervisor 302 provides each virtual machine 332 with a unique view of the physical disks 304. Thus, in these embodiments, the particular virtual disk 326 included in each virtual machine 332 can be unique when compared with the other virtual disks 326.

A virtual processor 328 can be a virtualized view of one or more physical processors 308 of the virtualization server 301. In some embodiments, the virtualized view of the physical processors 308 can be generated, provided and managed by hypervisor 302. In some embodiments, virtual processor 328 has substantially all of the same characteristics of at least one physical processor 308. In other embodiments, virtual processor 308 provides a modified view of physical processors 308 such that at least some of the characteristics of the virtual processor 328 are different than the characteristics of the corresponding physical processor 308.

Figure 4:
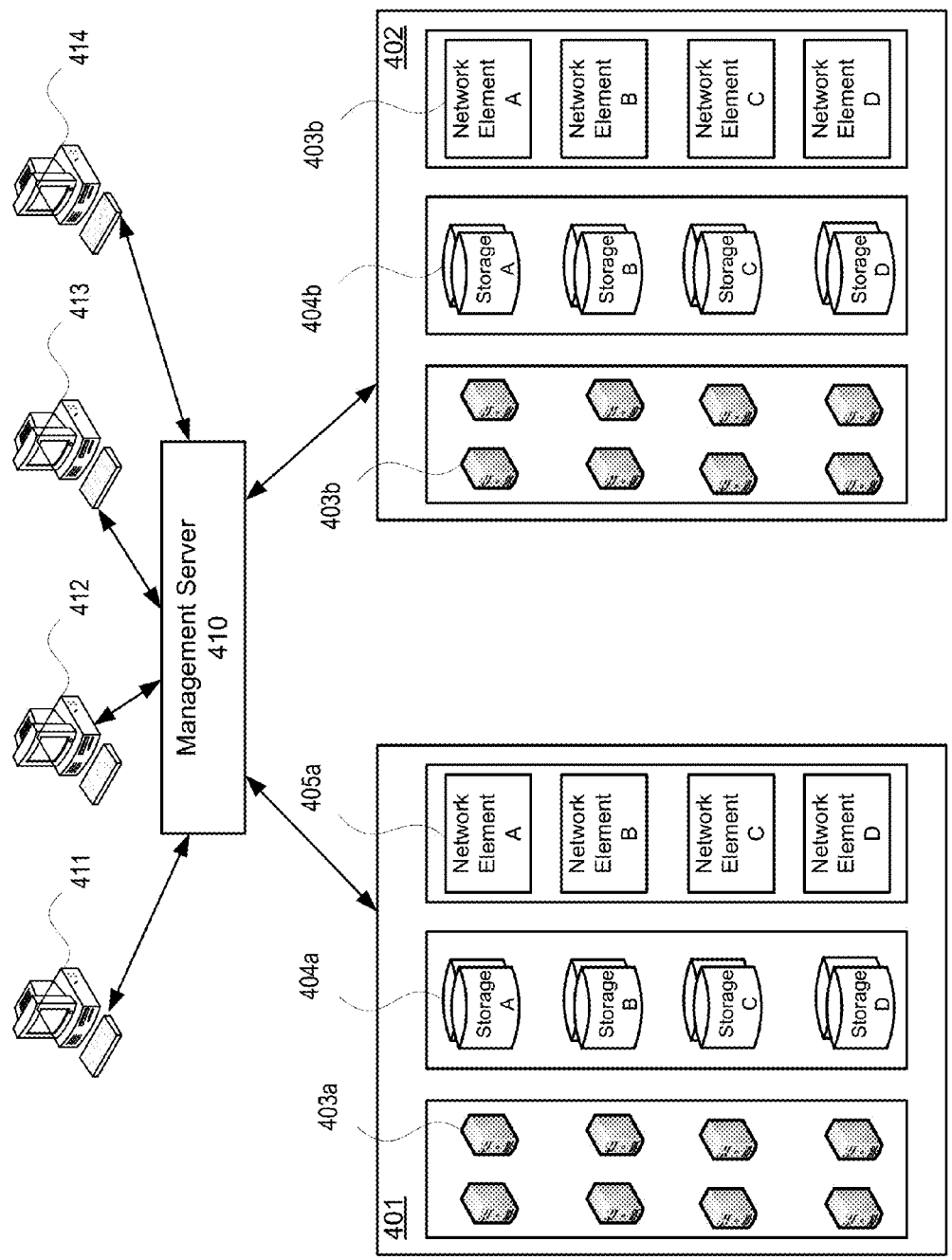
FIG. 4 depicts an illustrative cloud-based system architecture that may be used in accordance various aspects of the disclosure.

With further reference to FIG. 4, some aspects described herein may be implemented in a cloud-based environment. FIG. 4 illustrates an example of a cloud computing environment (or cloud system) 400. As seen in FIG. 4, client computers 411-414 may communicate with a cloud management server 410 to access the computing resources (e.g., host servers 403, storage resources 404, and network resources 405) of the cloud system.

Management server 410 may be implemented on one or more physical servers. The management server 410 may run, for example, CLOUDSTACK by Citrix Systems, Inc. of Ft. Lauderdale, Fla., or OPENSTACK, among others. Management server 410 may manage various computing resources, including cloud hardware and software resources, for example, host computers 403, data storage devices 404, and networking devices 405. The cloud hardware and software resources may include private and/or public components. For example, a cloud may be configured as a private cloud to be used by one or more particular customers or client computers 411-414 and/or over a private network. In other embodiments, public clouds or hybrid public-private clouds may be used by other customers over an open or hybrid networks.

Management server 410 may be configured to provide user interfaces through which cloud operators and cloud customers may interact with the cloud system. For example, the management server 410 may provide a set of APIs and/or one or more cloud operator console applications (e.g., web-based on standalone applications) with user interfaces to allow cloud operators to manage the cloud resources, configure the virtualization layer, manage customer accounts, and perform other cloud administration tasks. The management server 410 also may include a set of APIs and/or one or more customer console applications with user interfaces configured to receive cloud computing requests from end users via client computers 411-414, for example, requests to create, modify, or destroy virtual machines within the cloud. Client computers 411-414 may connect to management server 410 via the Internet or other communication network, and may request access to one or more of the computing resources managed by management server 410. In response to client requests, the management server 410 may include a resource manager configured to select and provision physical resources in the hardware layer of the cloud system based on the client requests. For example, the management server 410 and additional components of the cloud system may be configured to provision, create, and manage virtual machines and their operating environments (e.g., hypervisors, storage resources, services offered by the network elements, etc.) for customers at client computers 411-414, over a network (e.g., the Internet), providing customers with computational resources, data storage services, networking capabilities, and computer platform and application support. Cloud systems also may be configured to provide various specific services, including security systems, development environments, user interfaces, and the like.

Certain clients 411-414 may be related, for example, different client computers creating virtual machines on behalf of the same end user, or different users affiliated with the same company or organization. In other examples, certain clients 411-414 may be unrelated, such as users affiliated with different companies or organizations. For unrelated clients, information on the virtual machines or storage of any one user may be hidden from other users.

Referring now to the physical hardware layer of a cloud computing environment, availability zones 401-402 (or zones) may refer to a collocated set of physical computing resources. Zones may be geographically separated from other zones in the overall cloud of computing resources. For example, zone 401 may be a first cloud datacenter located in California, and zone 402 may be a second cloud datacenter located in Florida. Management sever 410 may be located at one of the availability zones, or at a separate location. Each zone may include an internal network that interfaces with devices that are outside of the zone, such as the management server 410, through a gateway. End users of the cloud (e.g., clients 411-414) might or might not be aware of the distinctions between zones. For example, an end user may request the creation of a virtual machine having a specified amount of memory, processing power, and network capabilities. The management server 410 may respond to the user's request and may allocate the resources to create the virtual machine without the user knowing whether the virtual machine was created using resources from zone 401 or zone 402. In other examples, the cloud system may allow end users to request that virtual machines (or other cloud resources) are allocated in a specific zone or on specific resources 403-405 within a zone.

In this example, each zone 401-402 may include an arrangement of various physical hardware components (or computing resources) 403-405, for example, physical hosting resources (or processing resources), physical network resources, physical storage resources, switches, and additional hardware resources that may be used to provide cloud computing services to customers. The physical hosting resources in a cloud zone 401-402 may include one or more computer servers 403, such as the virtualization servers 301 described above, which may be configured to create and host virtual machine instances. The physical network resources in a cloud zone 401 or 402 may include one or more network elements 405 (e.g., network service providers) comprising hardware and/or software configured to provide a network service to cloud customers, such as firewalls, network address translators, load balancers, virtual private network (VPN) gateways, Dynamic Host Configuration Protocol (DHCP) routers, and the like. The storage resources in the cloud zone 401-402 may include storage disks (e.g., solid state drives (SSDs), magnetic hard disks, etc.) and other storage devices.

The example cloud computing environment shown in FIG. 4 also may include a virtualization layer (e.g., as shown in FIGS. 1-3) with additional hardware and/or software resources configured to create and manage virtual machines and provide other services to customers using the physical resources in the cloud. The virtualization layer may include hypervisors, as described above in FIG. 3, along with other components to provide network virtualizations, storage virtualizations, etc. The virtualization layer may be as a separate layer from the physical resource layer, or may share some or all of the same hardware and/or software resources with the physical resource layer. For example, the virtualization layer may include a hypervisor installed in each of the virtualization servers 403 with the physical computing resources. Known cloud systems may alternatively be used, e.g., WINDOWS AZURE (Microsoft Corporation of Redmond Wash.), AMAZON EC2 (Amazon.com Inc. of Seattle, Wash.), IBM BLUE CLOUD (IBM Corporation of Armonk, N.Y.), or others.

Enterprise Mobility Management Architecture

Figure 5:
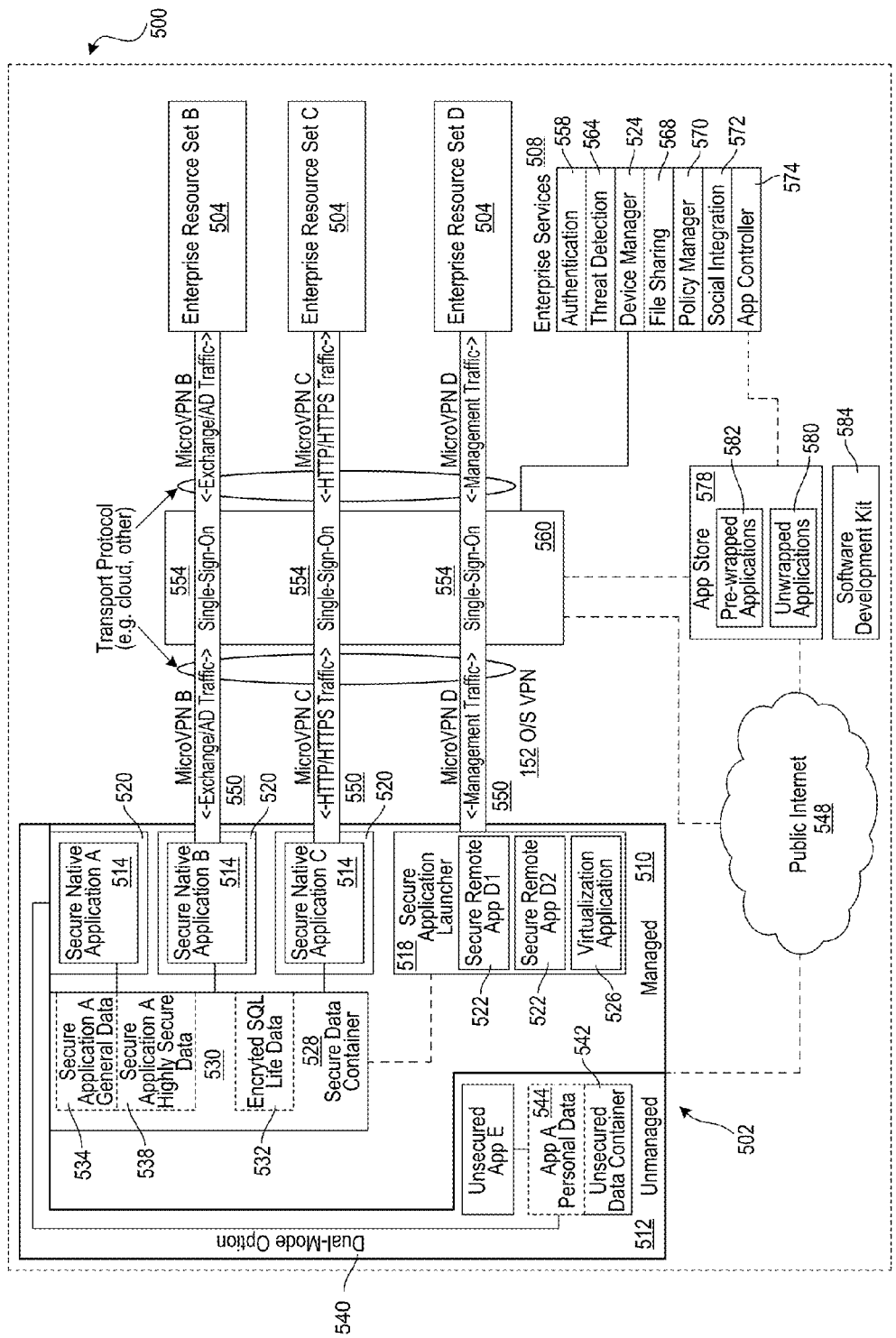
FIG. 5 depicts an illustrative enterprise mobility management system that may be used in accordance with one or more aspects of the disclosure.

FIG. 5 represents an enterprise mobility technical architecture 500 for use in a BYOD environment. The architecture enables a user of a mobile device 502 to both access enterprise or personal resources from a mobile device 502 and use the mobile device 502 for personal use. The user may access such enterprise resources 504 or enterprise services 508 using a mobile device 502 that is purchased by the user or a mobile device 502 that is provided by the enterprise to user. The user may utilize the mobile device 502 for business use only or for business and personal use. The mobile device may run an iOS operating system, and Android operating system, or the like. The enterprise may choose to implement policies to manage the mobile device 504. The policies may be implanted through a firewall or gateway in such a way that the mobile device may be identified, secured or security verified, and provided selective or full access to the enterprise resources. The policies may be mobile device management policies, mobile application management policies, mobile data management policies, or some combination of mobile device, application, and data management policies. A mobile device 504 that is managed through the application of mobile device management policies may be referred to as an enrolled device.

The operating system of the mobile device may be separated into a managed partition 510 and an unmanaged partition 512. The managed partition 510 may have policies applied to it to secure the applications running on and data stored in the managed partition. The applications running on the managed partition may be secure applications. In other embodiments, all applications may execute in accordance with a set of one or more policy files received separate from the application, and which define one or more security parameters, features, resource restrictions, and/or other access controls that are enforced by the mobile device management system when that application is executing on the device. By operating in accordance with their respective policy file(s), each application may be allowed or restricted from communications with one or more other applications and/or resources, thereby creating a virtual partition. Thus, as used herein, a partition may refer to a physically partitioned portion of memory (physical partition), a logically partitioned portion of memory (logical partition), and/or a virtual partition created as a result of enforcement of one or more policies and/or policy files across multiple apps as described herein (virtual partition). Stated differently, by enforcing policies on managed apps, those apps may be restricted to only be able to communicate with other managed apps and trusted enterprise resources, thereby creating a virtual partition that is impenetrable by unmanaged apps and devices.

The secure applications may be email applications, web browsing applications, software-as-a-service (SaaS) access applications, Windows Application access applications, and the like. The secure applications may be secure native applications 514, secure remote applications 522 executed by a secure application launcher 518, virtualization applications 526 executed by a secure application launcher 518, and the like. The secure native applications 514 may be wrapped by a secure application wrapper 520. The secure application wrapper 520 may include integrated policies that are executed on the mobile device 502 when the secure native application is executed on the device. The secure application wrapper 520 may include meta-data that points the secure native application 514 running on the mobile device 502 to the resources hosted at the enterprise that the secure native application 514 may require to complete the task requested upon execution of the secure native application 514. The secure remote applications 522 executed by a secure application launcher 518 may be executed within the secure application launcher application 518. The virtualization applications 526 executed by a secure application launcher 518 may utilize resources on the mobile device 502, at the enterprise resources 504, and the like. The resources used on the mobile device 502 by the virtualization applications 526 executed by a secure application launcher 518 may include user interaction resources, processing resources, and the like. The user interaction resources may be used to collect and transmit keyboard input, mouse input, camera input, tactile input, audio input, visual input, gesture input, and the like. The processing resources may be used to present a user interface, process data received from the enterprise resources 504, and the like. The resources used at the enterprise resources 504 by the virtualization applications 526 executed by a secure application launcher 518 may include user interface generation resources, processing resources, and the like. The user interface generation resources may be used to assemble a user interface, modify a user interface, refresh a user interface, and the like. The processing resources may be used to create information, read information, update information, delete information, and the like. For example, the virtualization application may record user interactions associated with a GUI and communicate them to a server application where the server application will use the user interaction data as an input to the application operating on the server. In this arrangement, an enterprise may elect to maintain the application on the server side as well as data, files, etc. associated with the application. While an enterprise may elect to "mobilize" some applications in accordance with the principles herein by securing them for deployment on the mobile device, this arrangement may also be elected for certain applications. For example, while some applications may be secured for use on the mobile device, others might not be prepared or appropriate for deployment on the mobile device so the enterprise may elect to provide the mobile user access to the unprepared applications through virtualization techniques. As another example, the enterprise may have large complex applications with large and complex data sets (e.g., material resource planning applications) where it would be very difficult, or otherwise undesirable, to customize the application for the mobile device so the enterprise may elect to provide access to the application through virtualization techniques. As yet another example, the enterprise may have an application that maintains highly secured data (e.g. human resources data, customer data, engineering data) that may be deemed by the enterprise as too sensitive for even the secured mobile environment so the enterprise may elect to use virtualization techniques to permit mobile access to such applications and data. An enterprise may elect to provide both fully secured and fully functional applications on the mobile device as well as a virtualization application to allow access to applications that are deemed more properly operated on the server side. In an embodiment, the virtualization application may store some data, files, etc. on the mobile phone in one of the secure storage locations. An enterprise, for example, may elect to allow certain information to be stored on the phone while not permitting other information.

In connection with the virtualization application, as described herein, the mobile device may have a virtualization application that is designed to present GUI's and then record user interactions with the GUI. The application may communicate the user interactions to the server side to be used by the server side application as user interactions with the application. In response, the application on the server side may transmit back to the mobile device a new GUI. For example, the new GUI may be a static page, a dynamic page, an animation, or the like, thereby providing access to remotely located resources.

The applications running on the managed partition may be stabilized applications. The stabilized applications may be managed by a device manager 524. The device manager 524 may monitor the stabilized applications and utilize techniques for detecting and remedying problems that would result in a destabilized application if such techniques were not utilized to detect and remedy the problems.

The secure applications may access data stored in a secure data container 528 in the managed partition 510 of the mobile device. The data secured in the secure data container may be accessed by the secure wrapped applications 514, applications executed by a secure application launcher 522, virtualization applications 526 executed by a secure application launcher 522, and the like. The data stored in the secure data container 528 may include files, databases, and the like. The data stored in the secure data container 528 may include data restricted to a specific secure application 530, shared among secure applications 532, and the like. Data restricted to a secure application may include secure general data 534 and highly secure data 538. Secure general data may use a strong form of encryption such as AES 128-bit encryption or the like, while highly secure data 538 may use a very strong form of encryption such as AES 256-bit encryption. Data stored in the secure data container 528 may be deleted from the device upon receipt of a command from the device manager 524. The secure applications may have a dual-mode option 540. The dual mode option 540 may present the user with an option to operate the secured application in an unsecured or unmanaged mode. In an unsecured or unmanaged mode, the secure applications may access data stored in an unsecured data container 542 on the unmanaged partition 512 of the mobile device 502. The data stored in an unsecured data container may be personal data 544. The data stored in an unsecured data container 542 may also be accessed by unsecured applications 548 that are running on the unmanaged partition 512 of the mobile device 502. The data stored in an unsecured data container 542 may remain on the mobile device 502 when the data stored in the secure data container 528 is deleted from the mobile device 502. An enterprise may want to delete from the mobile device selected or all data, files, and/or applications owned, licensed or controlled by the enterprise (enterprise data) while leaving or otherwise preserving personal data, files, and/or applications owned, licensed or controlled by the user (personal data). This operation may be referred to as a selective wipe. With the enterprise and personal data arranged in accordance to the aspects described herein, an enterprise may perform a selective wipe.

The mobile device may connect to enterprise resources 504 and enterprise services 508 at an enterprise, to the public Internet 548, and the like. The mobile device may connect to enterprise resources 504 and enterprise services 508 through virtual private network connections such as, for example, a microVPN or application-specific VPN. The virtual private network connections may be specific to particular applications 550, particular devices, particular secured areas on the mobile device, and the like 552. For example, each of the wrapped applications in the secured area of the phone may access enterprise resources through an application specific VPN such that access to the VPN would be granted based on attributes associated with the application, possibly in conjunction with user or device attribute information. The virtual private network connections may carry Microsoft Exchange traffic, Microsoft Active Directory traffic, HTTP traffic, HTTPS traffic, application management traffic, and the like. The virtual private network connections may support and enable single-sign-on authentication processes 554. The single-sign-on processes may allow a user to provide a single set of authentication credentials, which are then verified by an authentication service 558. The authentication service 558 may then grant to the user access to multiple enterprise resources 504, without requiring the user to provide authentication credentials to each individual enterprise resource 504.

The virtual private network connections may be established and managed by an access gateway 560. The access gateway 560 may include performance enhancement features that manage, accelerate, and improve the delivery of enterprise resources 504 to the mobile device 502. The access gateway may also re-route traffic from the mobile device 502 to the public Internet 548, enabling the mobile device 502 to access publicly available and unsecured applications that run on the public Internet 548. The mobile device may connect to the access gateway via a transport network 562. The transport network 562 may be a wired network, wireless network, cloud network, local area network, metropolitan area network, wide area network, public network, private network, and the like.

The enterprise resources 504 may include email servers, file sharing servers, SaaS applications, Web application servers, Windows application servers, and the like. Email servers may include Exchange servers, Lotus Notes servers, and the like. File sharing servers may include ShareFile servers, and the like. SaaS applications may include Salesforce, and the like. Windows application servers may include any application server that is built to provide applications that are intended to run on a local Windows operating system, and the like. The enterprise resources 504 may be premise-based resources, cloud based resources, and the like. The enterprise resources 504 may be accessed by the mobile device 502 directly or through the access gateway 560. The enterprise resources 504 may be accessed by the mobile device 502 via a transport network 562. The transport network 562 may be a wired network, wireless network, cloud network, local area network, metropolitan area network, wide area network, public network, private network, and the like.

The enterprise services 508 may include authentication services 558, threat detection services 564, device manager services 524, file sharing services 568, policy manager services 570, social integration services 572, application controller services 574, and the like. Authentication services 558 may include user authentication services, device authentication services, application authentication services, data authentication services and the like. Authentication services 558 may use certificates. The certificates may be stored on the mobile device 502, by the enterprise resources 504, and the like. The certificates stored on the mobile device 502 may be stored in an encrypted location on the mobile device, the certificate may be temporarily stored on the mobile device 502 for use at the time of authentication, and the like. Threat detection services 564 may include intrusion detection services, unauthorized access attempt detection services, and the like. Unauthorized access attempt detection services may include unauthorized attempts to access devices, applications, data, and the like. Device management services 524 may include configuration, provisioning, security, support, monitoring, reporting, and decommissioning services. File sharing services 568 may include file management services, file storage services, file collaboration services, and the like. Policy manager services 570 may include device policy manager services, application policy manager services, data policy manager services, and the like. Social integration services 572 may include contact integration services, collaboration services, integration with social networks such as Facebook, Twitter, and LinkedIn, and the like. Application controller services 574 may include management services, provisioning services, deployment services, assignment services, revocation services, wrapping services, and the like.

The enterprise mobility technical architecture 500 may include an application store 578. The application store 578 may include unwrapped applications 580, pre-wrapped applications 582, and the like. Applications may be populated in the application store 578 from the application controller 574. The application store 578 may be accessed by the mobile device 502 through the access gateway 560, through the public Internet 548, or the like. The application store may be provided with an intuitive and easy to use User Interface.

A software development kit 584 may provide a user the capability to secure applications selected by the user by wrapping the application as described previously in this description. An application that has been wrapped using the software development kit 584 may then be made available to the mobile device 502 by populating it in the application store 578 using the application controller 574.

The enterprise mobility technical architecture 500 may include a management and analytics capability 588. The management and analytics capability 588 may provide information related to how resources are used, how often resources are used, and the like. Resources may include devices, applications, data, and the like. How resources are used may include which devices download which applications, which applications access which data, and the like. How often resources are used may include how often an application has been downloaded, how many times a specific set of data has been accessed by an application, and the like.

Figure 6:
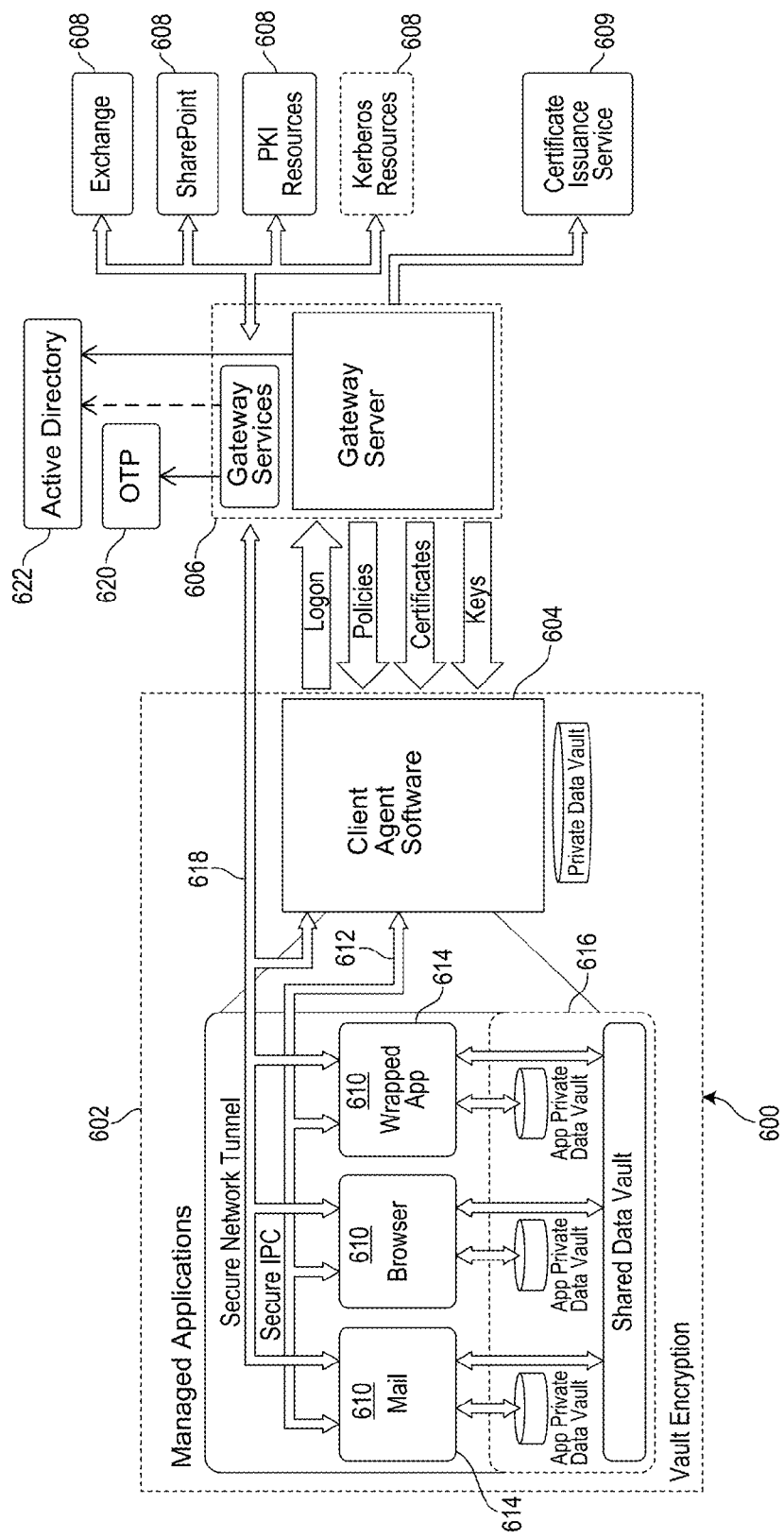
FIG. 6 depicts another illustrative enterprise mobility management system that may be used in accordance with various aspects of the disclosure.

FIG. 6 is another illustrative enterprise mobility management system 600. Some of the components of the mobility management system 500 described above with reference to FIG. 5 have been omitted for the sake of simplicity. The architecture of the system 600 depicted in FIG. 6 is similar in many respects to the architecture of the system 500 described above with reference to FIG. 5 and may include additional features not mentioned above.

In this case, the left hand side represents an enrolled mobile device 602 with a client agent 604, which interacts with gateway server 606 (which includes access gateway and application controller functionality) to access various enterprise resources 608 and services 609 such as Exchange, Sharepoint, PKI Resources, Kerberos Resources, Certificate Issuance service, as shown on the right hand side above. Although not specifically shown, the mobile device 602 may also interact with an enterprise application store (StoreFront) for the selection and downloading of applications.

The client agent 604 acts as the UI (user interface) intermediary for Windows apps/desktops hosted in an Enterprise data center, which are accessed using the HDX/ICA display remoting protocol. The client agent 604 also supports the installation and management of native applications on the mobile device 602, such as native iOS or Android applications. For example, the managed applications 610 (mail, browser, wrapped application, secure container to which a VPN, such as an application-specific policy-controlled VPN can connect to) shown in the figure above are all native applications that execute locally on the device.

Client agent 604 and application management framework of this architecture act to provide policy driven management capabilities and features such as connectivity and SSO (single sign on) to enterprise resources/services 608. The client agent 604 handles primary user authentication to the enterprise, normally to access gateway (AG) with SSO to other gateway server components. The client agent 604 obtains policies from gateway server 606 to control the behavior of the managed applications 610 on the mobile device 602.

The Secure IPC links 612 between the native applications 610 and client agent 604 represent a management channel, which allows client agent to supply policies to be enforced by the application management framework 614 "wrapping" each application. The IPC channel 612 also allows client agent 604 to supply credential and authentication information that enables connectivity and SSO to enterprise resources 608. Finally the IPC channel 612 allows the application management framework 614 to invoke user interface functions implemented by client agent 604, such as online and offline authentication.

Communications between the client agent 604 and gateway server 606 are essentially an extension of the management channel from the application management framework 614 wrapping each native managed application 610. The application management framework 614 requests policy information from client agent 604, which in turn requests it from gateway server 606. The application management framework 614 requests authentication, and client agent 604 logs into the gateway services part of gateway server 606 (e.g., NetScaler access gateway). Client agent 604 may also call supporting services on gateway server 606, which may produce input material to derive encryption keys for the local data vaults 616, or provide client certificates which may enable direct authentication to PKI protected resources, as more fully explained below.

In more detail, the application management framework 614 "wraps" each managed application 610. This may be incorporated via an explicit build step, or via a post-build processing step. The application management framework 614 may "pair" with client agent 604 on first launch of an application 610 to initialize the Secure IPC channel and obtain the policy for that application. The application management framework 614 may enforce relevant portions of the policy that apply locally, such as the client agent login dependencies and some of the containment policies that restrict how local OS services may be used, or how they may interact with the application 610.

The application management framework 614 may use services provided by client agent 604 over the Secure IPC channel 612 to facilitate authentication and internal network access. Key management for the private and shared data vaults 616 (containers) may be also managed by appropriate interactions between the managed applications 610 and client agent 604. Vaults 616 may be available only after online authentication, or may be made available after offline authentication if allowed by policy. First use of vaults 616 may require online authentication, and offline access may be limited to at most the policy refresh period before online authentication is again required.

Network access to internal resources may occur directly from individual managed applications 610 through access gateway 606. The application management framework 614 is responsible for orchestrating the network access on behalf of each application 610. Client agent 604 may facilitate these network connections by providing suitable time limited secondary credentials obtained following online authentication. Multiple modes of network connection may be used, such as reverse web proxy connections and end-to-end VPN-style tunnels 618.

The Mail and Browser managed applications 610 have special status and may make use of facilities that might not be generally available to arbitrary wrapped applications. For example, the Mail application may use a special background network access mechanism that allows it to access Exchange over an extended period of time without requiring a full AG logon. The Browser application may use multiple private data vaults to segregate different kinds of data.

This architecture supports the incorporation of various other security features. For example, gateway server 606 (including its gateway services) in some cases will not need to validate AD passwords. It can be left to the discretion of an enterprise whether an AD password is used as an authentication factor for some users in some situations. Different authentication methods may be used if a user is online or offline (i.e., connected or not connected to a network).

Step up authentication is a feature wherein gateway server 606 may identify managed native applications 610 that are allowed to have access to highly classified data requiring strong authentication, and ensure that access to these applications is only permitted after performing appropriate authentication, even if this means a re-authentication is required by the user after a prior weaker level of login.

Another security feature of this solution is the encryption of the data vaults 616 (containers) on the mobile device 602. The vaults 616 may be encrypted so that all on-device data including files, databases, and configurations are protected. For on-line vaults, the keys may be stored on the server (gateway server 606), and for off-line vaults, a local copy of the keys may be protected by a user password or biometric validation. When data is stored locally on the device 602 in the secure container 616, it is preferred that a minimum of AES 256 encryption algorithm be utilized.

Other secure container features may also be implemented. For example, a logging feature may be included, wherein all security events happening inside an application 610 are logged and reported to the backend. Data wiping may be supported, such as if the application 610 detects tampering, associated encryption keys may be written over with random data, leaving no hint on the file system that user data was destroyed. Screenshot protection is another feature, where an application may prevent any data from being stored in screenshots. For example, the key window's hidden property may be set to YES. This may cause whatever content is currently displayed on the screen to be hidden, resulting in a blank screenshot where any content would normally reside.

Local data transfer may be prevented, such as by preventing any data from being locally transferred outside the application container, e.g., by copying it or sending it to an external application. A keyboard cache feature may operate to disable the autocorrect functionality for sensitive text fields. SSL certificate validation may be operable so the application specifically validates the server SSL certificate instead of it being stored in the keychain. An encryption key generation feature may be used such that the key used to encrypt data on the device is generated using a passphrase supplied by the user (if offline access is required). It may be XORed with another key randomly generated and stored on the server side if offline access is not required. Key Derivation functions may operate such that keys generated from the user password (or biometric factors) use KDFs (key derivation functions, notably PBKDF2) rather than creating a cryptographic hash of it. The latter makes a key susceptible to brute force or dictionary attacks.

Further, one or more initialization vectors may be used in encryption methods. An initialization vector will cause multiple copies of the same encrypted data to yield different cipher text output, preventing both replay and cryptanalytic attacks. This will also prevent an attacker from decrypting any data even with a stolen encryption key if the specific initialization vector used to encrypt the data is not known. Further, authentication then decryption may be used, wherein application data is decrypted only after the user has authenticated within the application. Another feature may relate to sensitive data in memory, which may be kept in memory (and not in disk) only when it's needed. For example, login credentials may be wiped from memory after login, and encryption keys and other data inside objective-C instance variables are not stored, as they may be easily referenced. Instead, memory may be manually allocated for these.

An inactivity timeout may be implemented, wherein after a policy-defined period of inactivity, a user session is terminated.

Data leakage from the application management framework 614 may be prevented in other ways. For example, when an application 610 is put in the background, the memory may be cleared after a predetermined (configurable) time period. When backgrounded, a snapshot may be taken of the last displayed screen of the application to fasten the foregrounding process. The screenshot may contain confidential data and hence should be cleared.

Another security feature relates to the use of an OTP (one time password) 620 without the use of an AD (active directory) 622 password for access to one or more applications. In some cases, some users do not know (or are not permitted to know) their AD password, so these users may authenticate using an OTP 620 such as by using a hardware OTP system like SecurID (OTPs may be provided by different vendors also, such as Entrust or Gemalto). In some cases, after a user authenticates with a user ID, a text is sent to the user with an OTP 620. In some cases, this may be implemented only for online use, with a prompt being a single field.

An offline password may be implemented for offline authentication for those applications 610 for which offline use is permitted via enterprise policy. For example, an enterprise may want an enterprise application to be accessed in this manner. In this case, the client agent 604 may require the user to set a custom offline password and the AD password is not used. Gateway server 606 may provide policies to control and enforce password standards with respect to the minimum length, character class composition, and age of passwords, such as described by the standard Windows Server password complexity requirements, although these requirements may be modified.

Another feature relates to the enablement of a client side certificate for certain applications 610 as secondary credentials (for the purpose of accessing PKI protected web resources via the application management framework micro VPN feature). For example, an application may utilize such a certificate. In this case, certificate-based authentication using ActiveSync protocol may be supported, wherein a certificate from the client agent 604 may be retrieved by gateway server 606 and used in a keychain. Each managed application may have one associated client certificate, identified by a label that is defined in gateway server 606.

Gateway server 606 may interact with an Enterprise special purpose web service to support the issuance of client certificates to allow relevant managed applications to authenticate to internal PKI protected resources.

The client agent 604 and the application management framework 614 may be enhanced to support obtaining and using client certificates for authentication to internal PKI protected network resources. More than one certificate may be supported, such as to match various levels of security and/or separation requirements. The certificates may be used by the Mail and Browser managed applications, and ultimately by arbitrary wrapped applications (provided those applications use web service style communication patterns where it is reasonable for the application management framework to mediate https requests).

Application management client certificate support on iOS may rely on importing a PKCS 12 BLOB (Binary Large Object) into the iOS keychain in each managed application for each period of use. Application management framework client certificate support may use a HTTPS implementation with private in-memory key storage. The client certificate will never be present in the iOS keychain and will not be persisted except potentially in "online-only" data value that is strongly protected.

Mutual SSL may also be implemented to provide additional security by requiring that a mobile device 602 is authenticated to the enterprise, and vice versa. Virtual smart cards for authentication to gateway server 606 may also be implemented.

Both limited and full Kerberos support may be additional features. The full support feature relates to an ability to do full Kerberos login to Active Directory (AD) 622, using an AD password or trusted client certificate, and obtain Kerberos service tickets to respond to HTTP Negotiate authentication challenges. The limited support feature relates to constrained delegation in AFEE, where AFEE supports invoking Kerberos protocol transition so it can obtain and use Kerberos service tickets (subject to constrained delegation) in response to HTTP Negotiate authentication challenges. This mechanism works in reverse web proxy (aka CVPN) mode, and when http (but not https) connections are proxied in VPN and MicroVPN mode.

Another feature relates to application container locking and wiping, which may automatically occur upon jail-break or rooting detections, and occur as a pushed command from administration console, and may include a remote wipe functionality even when an application 610 is not running.

A multi-site architecture or configuration of an enterprise application and application controller may be supported that allows users to be service from one of several different locations in case of failure.

In some cases, managed applications 610 may be allowed to access a certificate and private key via an API (example OpenSSL). Trusted managed applications 610 of an enterprise may be allowed to perform specific Public Key operations with an application's client certificate and private key. Various use cases may be identified and treated accordingly, such as when an application behaves like a browser and no certificate access is required, when an application reads a certificate for "who am I," when an application uses the certificate to build a secure session token, and when an application uses private keys for digital signing of important data (e.g. transaction log) or for temporary data encryption.

Illustrative Embodiment(s)

Many mobile resource management (MRM) solutions (also referred to herein as EMM, MDM and MAM, each of which may include MRM) may face the challenge of managing applications on an otherwise unmanaged mobile devices and ensuring that information used by the managed application cannot escape from the set of trusted enterprise applications that IT administrators make available to their enterprise users. Information can escape in any number of ways, and a robust EMM system will provide policies and enforcement mechanisms to prevent such information leakage where IT administrators deem it proper and to provide policy overrides, where appropriate. However, even with a robust set of information containment policies, there are other threats to the security of the information managed by applications on mobile devices.

One such threat is that applications may store some information persistently on the mobile device by writing files or other data into the flash memory or other persistent storage on the device. Most mobile platforms will segregate persistent data recorded by applications into private application sandboxes. However this sandboxing can be defeated with common tools capable of rooting or jail-breaking the device. Rooting and jail-breaking are techniques that seek to replace parts of the mobile device operating system platform often with goal of defeating app sandboxing, application integrity checks, and other OS provided security mechanisms. Rootkits and jail-breaking software for most popular mobile platforms are readily available on the public Internet and easy to use. Since rooting and jail-breaking are so easy to accomplish, most enterprises do not wish to rely on mobile device OS enforced sandbox as the only means of protecting data that an application may need to persist.

Some mobile device platforms additionally allow information to be encrypted in its persistent form and some applications do take advantage of these features. Invariably, such encryption mechanisms rely on the encryption keys being held on the device itself with the keys themselves protected by a user supplied PIN or passcode. The fact that the keys are held on the device and protected by weak cryptographic factors means that the data is not particularly well protected from hacking, particularly if a device is stolen and hacker has ample time to try to unlock the keys. Also, since the keys are in possession of the device holder, an enterprise is powerless to remove them or revoke access for a terminated employee unless they can recover the device.

Another issue with app sandboxing that occurs on mobile platforms is that it is problematic to have a single repository of documents that are available to all managed applications on the mobile device and potentially synced offline to cloud based storage. Mobile applications work around the sandbox limits in various ways, all of which have drawbacks. Often, they will exchange files of certain fixed types with other applications that have registered to accept certain those same types. The drawback here is that one ends up with multiple copies of a particular file in each app's sandbox. If one or more apps wish to edit the file content, keeping track of which app has latest versions is problematic for users.

One can overcome the issue highlighted above if users are trained to always send their modified documents back to a common sync agent application which might also be charged with syncing documents to/from cloud based storage. The Citrix Sharefile mobile application is an example of an application that permits this sort of data exchange with cloud-based sync. The drawback here is that these extra steps are easy to forget. Also, they are not required when using equivalent desktop applications that operate on the notion of shared documents folders for all applications. These two facts can lead to data file consistency issues and poor user experience if users are not properly trained.

Another approach to this problem is to save the files that one wishes to share into shared storage on those mobile platforms that support this concept. This has the downside that shared storage is world readable and therefore shared with all applications. Once information is placed into shared storage, containment of the information is lost since any application on mobile device can read it. Also the data can trivially be accessed by anyone who gains physical access to the device using standard file viewers and development tools.

The challenges of information containment and sharing of documents between trusted applications that are highlighted above are overcome by introducing the concept of an encrypted data vault. As illustrated in FIGS. 5 and 6, various embodiments described herein provide an encrypted data vault (also referred variously herein as a secure container, container, data vault, vault or private data vault) for use with, for example, one or more managed applications of a mobile device. An encrypted data vault can be considered a logical interface into which any or all persistent data read/written by a mobile application (which would otherwise end up in a writeable file in the app sandbox) will be redirected. The contents of the vault may themselves be written into file(s) held inside an app sandbox. The contents of all files and the file metadata itself (name, size, access times, etc.) may be all encrypted.

Referring back to FIG. 6 (various components described below can also be found in the diagram of FIG. 5), which shows an illustrative environment in which embodiments hereof can be practiced, a mobile device 602, such as a smartphone, tablet, PDA, and the like, has installed upon it various applications. The applications include a set of managed applications 610, which are managed by enterprise mobility management system 600, such as an enterprise application. Mobile device 602 may also include one or more unmanaged applications (e.g., applications stored in unmanaged partition 512 of FIG. 5, or applications running in an unmanaged mode of operation), such as a personal application, which is not managed by the enterprise. In some examples, client agent software 604 is also installed on the mobile device 602. The client agent software 604, also referred to herein as a "client agent" or "enterprise mobility management (EMM) client," is configured to connect, e.g., via a network such as the Internet, with an a gateway server or access gateway, which typically provides access to enterprise resources (e.g., cloud resources) or servers, which may include an authentication server, an application store, and a key server.

The illustrated mobile device 602 may include a shared data vault. The shared data vault may include encrypted files and/or data objects accessible to each of the managed applications 610.

In some examples, each managed application may also be associated with a respective private data vault. Encryption keys for the private application vaults, as well as an encryption key for the shared vault may be obtained, via the access gateway, such as from a key server or the access gateway itself, and can be held temporarily within the mobile device.

Strong encryption algorithms (e.g. FIPS 140-2 certified) may be used to protect information placed into the vault with keys that are managed by the enterprise rather than the users themselves. Keys may be assigned based on a tuple of user, device, and application or app group. That implies that distinct key sets are used each unique combination of user, device, and application/app group. The keys may be maintained off device in an enterprise key management server. The keys may be downloaded temporarily to the mobile device to enable data access, but only after authenticating the user, device, and application in question. If this is the first access to the protected files in a long time, the user may be forced to authenticate by logging on to an access gateway. Periodically these keys will need to be refreshed as dictated by the time to live policy setting for the keys. When refreshing, as long as user has maintains an active logon with the access gateway, this refreshing of keys can occur without user interaction. If user logs off or their logon session expires, then the refreshing of keys will need to be strongly authenticated again. These aspects, and others, will be discussed in connection with FIG. 11.

To support random access to any range of bytes within encrypted data, a scheme that uses encrypted blocks is may be used. The keys used to encrypt/decrypt each of the blocks may be derived mathematically from base keys and the file/block offset. Similarly, different files may use initialization vectors for the cryptography as well.

For efficiency, the system may read ahead or delay writing of data to a data vault as necessary to optimize application performance. Delayed write of encrypted data should in most instances be flushed prior to closing files or exiting the application.

An application may be written in such a way that it is aware of the presence of the vaults. Applications written with this awareness can utilize any number of data vaults, which they can identify explicitly with vault name identifiers or resource names. However applications will not always be written with such awareness. Correspondingly, the policies can be used to configure a default data vault for each application. The default data vault of an application is used for the transparent redirection of all application file I/O that would otherwise end up in a writable portion of the application sandbox or shared storage.

Each managed application may be associated with a respective policy (e.g., provided by the enterprise via the gateway server or access gateway). In some examples, the policies may be provided in the form of files, such as XML or JSON files, in which the respective policy is expressed as a set of key/value pairs. A policy may designate an encrypted data vault for data being processed in connection with the respective application such as, for example, data specified by read and write operations from the application. Accordingly, read and write operations to/from the application may be processed in accordance with the respective policy.

Depending on settings or definitions specified by the policies, managed applications can be constrained to exchange files and/or data only with other applications within the set of managed application 610. For example, API calls from the application specifying file reads or writes can be intercepted by injected code of the application or the "wrapping" of the application. The policy for that application may be read, and the read or write operation specified is diverted to an encrypted vault (e.g., the private vault or the shared vault), depending on the settings in the policy (or the absence of settings in the policy).

In various embodiments, code injected into the application or code "wrapping" the application may intercept API calls made by an application. Based on the intercepted API call, the policy for the application may be consulted, and the API call may be blocked, allowed, redirected further based on the policy. Such a process can be applied for selecting an application that can be used to open a file or data element identified by a link or icon (e.g., using Open In). In another example, the above process can be applied for copying data or data objects from one application and pasting the data or data objects in another application (e.g., via a hidden, encrypted paste buffer). In yet another example, the above process can be applied for moving files into and/or out of a protected data vault, as described herein. Essentially, any operation used to move data into and/or out of an application can make use of the above technique.

In some examples, managed applications can be assigned to different groups. In such cases, policies may include records of groups and group members. The flow of files and/or data between applications can thus be further restricted to members of particular groups. For example, each group may be provided with its own shared vault. Providing different groups of mobile applications within the set of managed applications 610 can help to segregate applications handling highly sensitive data from those that handle less sensitive data.

Applications may be assigned to a default vault as dictated by policy. In some variations, applications that share the same group may inherit the same default data vault. In this manner, applications not only gain the security of the encrypted container for their data, but apps configured with the same default data vault will see a single consistent view of their data shared with other similarly configured file applications.

In some instances, if policy does not dictate that an application is configured into a shared group or dictate a default vault for the application, then all data may be redirected to the application's corresponding private vault (private vaults as illustrated in FIG. 6). However if an application were configured into a shared group, data may be redirected to the shared vault. Even when some data is redirected to the shared vault, Particular data types, such as data designated for special private directories like /tmp, would continue to flow to the application's private vault.

In embodiments with, for example, a shared data vault, a common agent may manage the shared data on behalf of all applications. Without such an agent, it may be more difficult to share data among the applications transparently. While some embodiments may implement such an agent as a network-attached service that does not exist on the mobile device itself, such embodiments may preclude offline access to the encrypted data vault. Other embodiments may implement the agent as another application installed on the mobile device (a "client agent"). There are certainly other possible designs for implementing shared vaults. For example, one can use shared storage coupled with inter-process synchronization mechanisms to coordinate access.

Enterprises may create (or adapt) their native mobile applications using tools and SDKs associated with the enterprise mobility management solution they have chosen to deploy. In preparing their app for deployment, they certainly have the freedom to (re)write specific application logic to utilize encrypted data vault services exposed by the SDK as needed for their application.

However, in some embodiments, an application may be used with standard file system APIs of the platform for which the applications were originally developed. As such, the application's file access services may be redirected to one or more data vaults dictated by policy rather than rewriting their application. This approach also allows an administrator to reconfigure targeted vaults without directly modifying and recompiling the application. Such embodiments will be discussed further in connection with FIG. 7.

When taking the policy-driven approach, the application developer need not worry about the specifics of how to interface with the private vault services. Instead, by integrating the header files, libraries, and run-time support of the framework code with the application, all file system APIs called by the application may be intercepted by a policy-aware interception layer that, in some embodiments, forms a part of the managed application. For example, the policy-aware interception layer may be formed by framework or wrapper code that is included in the application. Logically, the policy-aware interception layer may be located between the application and the operating system services. After the policy-aware interception layer performs the interception, the intercepted API call may, in some variations, be redirected to the client agent or perform processing on the API call at the interception layer (e.g., encrypt/decrypt the API call, etc.).

Assuming the data vault feature is configured, then based on the policies in force for the current user, device, and application, a set of default vaults will be selected and the file system API interception layer will be configured to target them. Using a policy-driven approach may permit multiple applications to be bound to the same default vaults and may further permit secure sharing of data between properly configured managed applications. Some of these aspects, among others, will be discussed below in connection with FIG. 10.

After preparing the application, the managed application may be uploaded to a server for the purpose of publishing the application for the enterprise users to consume, such as via an application store. As part of this application publishing workflow, an IT administrator will choose policies and settings that apply to the application and associated user roles. Once uploaded and configured, the applications may be made available to organization's employees to peruse and install based on their role within the organization. Alternatively, such applications can be pushed directly to mobile devices for employees who have enrolled their device with a corporate MDM server. Some of these aspects, among others, will be discussed below in connection with FIG. 12.

When a user executes a managed application on the mobile device, the user is typically challenged to authenticate their corporate identity along with passwords and other factors as dictated by corporate policy. After having strongly authenticated the user, device, and application, the access manager components of the system may verify that the user is entitled to the application and download the configured policies and/or encryption and decryption keys for this specific application and user. Some of these aspects, among others, will be discussed below in connection with FIG. 11.

Based on those policies, the application management framework that is delivered with the managed application may configure itself (e.g., with the client agent's assistance). For example, one or more default vaults may be selected for use and the policy-aware interception layer may be configured to target the selected vaults. If a configured data vault does not already exist, a new empty vault is initialized. This ensures that a change in data vault policies that would select a not-previously-used vault will appear to the application as if it had been recently installed (e.g. empty writable directories). Some of these aspects, among others, will be discussed below in connection with FIG. 10.

As the application begins to utilize the file system APIs, the policy-aware interception layer looks for file accesses that intersect the writable portions of the app sandbox or shared storage. Such files are flagged and tracked by the interception layer such that all subsequent file I/O is passed through encryption/decryption before being placed into the real file container that holds the data.

When the data vault is private to the application, the data vault services layer may directly use the mobile platform's file I/O functions to read and write encrypted version of the data. Also, all file directory access functions may be similarly intercepted such that the real file names and sizes can be obscured.

When the data vault is to be shared with another application, the same processes described above may be used and may occur in a common file system repository. For example, when the interception layer is operating on a shared data vault, the data vault services may operate not by directly reading/writing encrypted data, but rather by redirected these services via a remote procedure call mechanism to the client agent. Within the client agent, the same local data vault services used for private vault files may be used for the shared vault content.

Figure 7:
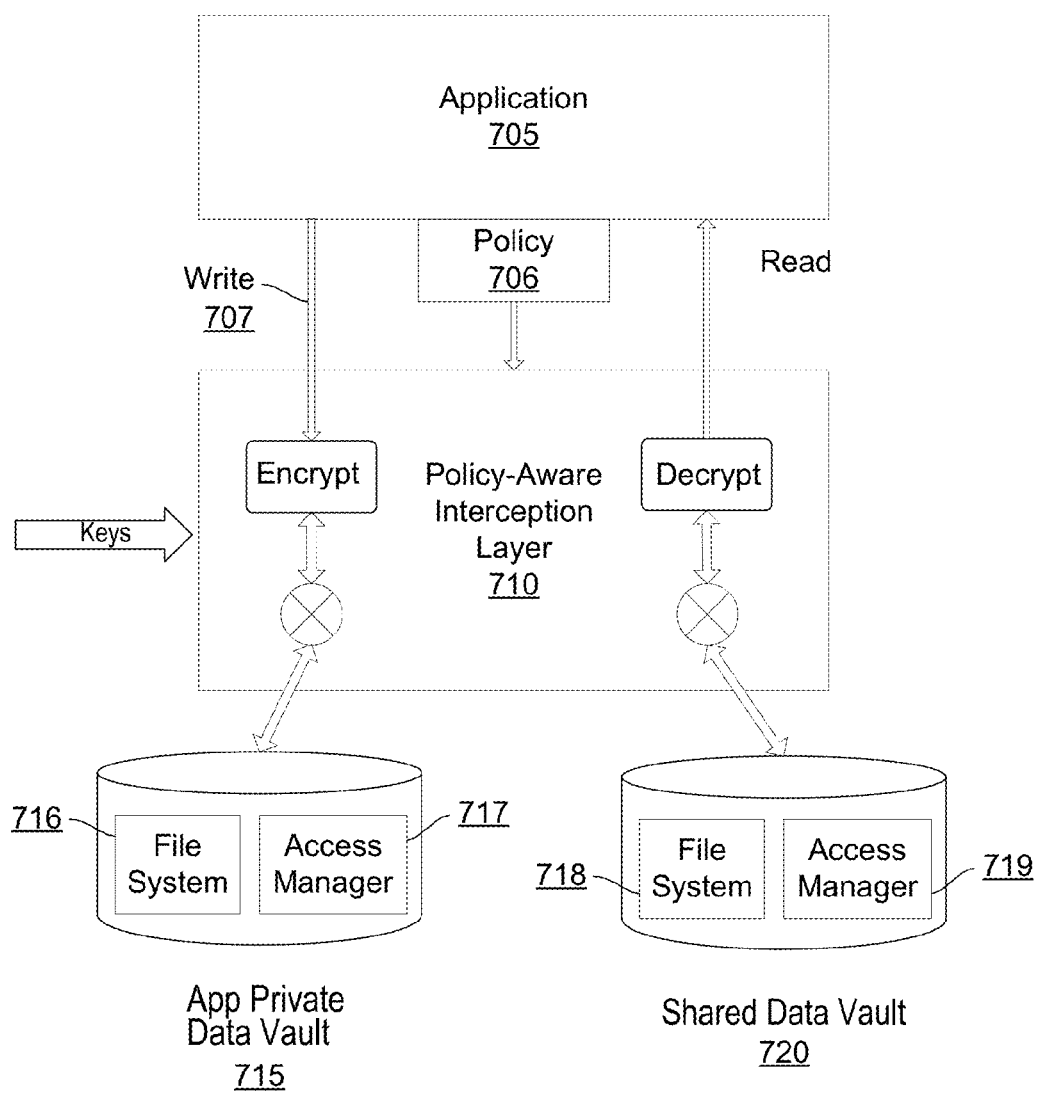
FIG. 7 illustrates an example diagram where a private data vault and shared data vault may be accessed according to one or more aspects of the disclosure.

FIG. 7 illustrates various features of the mobile device 602 (and mobile device 502 of FIG. 5) in connection with the above discussion of data vaults. In particular, FIG. 7 illustrates an example diagram where a private data vault and shared data vault may be accessed. Here, the application 705 (representative of any of the applications of the managed set 610 of FIG. 6 or any application 514 of FIG. 5) issues read operations 708 and write operations 707 to persistent space on the mobile device. Here, read and write operations are intercepted by the policy-aware interception layer 710 and directed to an appropriate encrypted vault. For read operations 708, the policy-aware interception layer 710 may inspect the type of data to be read and consult the policy 706 stored by the mobile device associated with the application 705. If the policy 706 specifies that the identified type of data is stored in the private data vault 715, the policy-aware interception layer 710 may obtain the data from the private data vault 715. However, if the policy 706 specifies that the identified type of data is stored in the shared data vault 720, the policy-aware interception layer 710 may obtain the data from the shared data vault 720. The policy-aware interception layer 710 then may decrypt the data (using an encryption key, such as one obtained via the access gateway) and return the data to the application 705 (as illustrated by the arrow for read operations 708).

In the case of write operations 707, the policy-aware interception layer 710 may inspect the type of data to be written and consult the policy 706. If the policy 706 specifies that the identified type of data is to be stored in the private data vault 715, the policy-aware interception layer 710 may encrypt the data and store the data in the private data vault 715. However, if the policy 706 specifies that the identified type of data is to be stored in the shared data vault 720, the policy-aware interception layer 710 may encrypt the data and store the data in the shared data vault 720.

Different keys may be used for encrypting/decrypting data to/from the private data vault 715 and the shared data vault 720.

The data vault may also each comprise a file system provides for the logical storage of the data in the data vault. As illustrated in FIG. 7, private data vault 715 has a file system 716 and shared data vault 720 has file system 717. A data vault (or container) can comprise an access manager that governs access to the file system by applications and other components of the mobile device. As illustrated in FIG. 7, private data vault 715 has access manager 718 and shared data vault 720 has access manager 719.

One or more policies can limit access to a container's file system based on various settings or definitions such as, for example, (1) which application or other component of the mobile device is requesting access, (2) the data being accessed/processed, (3) time or date, (4) geographical position of the mobile device, (5) whether the requesting application or other component provides a correct certificate or credentials, (6) whether the user of the mobile device provides correct credentials, (8) other conditions, or any combination thereof. A user's credentials can comprise, for example, a password, one or more answers to security questions (e.g., What is the mascot of your high school?), biometric information (e.g., fingerprint scan, eye-scan, etc.), and the like. Hence, by using the access manager, the container can be configured to be accessed only by applications that are authorized to access the container. As one example, the access manager can enable managed applications installed on the mobile device to access data stored in the container and to prevent unmanaged applications from accessing the data stored in the container.

Temporal and geographic restrictions on data access may be useful in some variations. For example, an enterprise administrator may deploy a policy that restricts the availability of the data (stored within the container) to a specified time window and/or a geographic zone (e.g., as determined by a GPS chip of the mobile device) within which the mobile device must be currently located in order to access the data. Further, the policy can instruct deletion of data from the container or otherwise make them unavailable when the specified time period expires or if the mobile device is taken outside of the defined geographic zone. One example of deleting data from a container will be discussed below in connection with FIG. 9.

Additionally, policies may forbid data from being saved within a container. In such embodiments, the document can be available for viewing on the mobile device only when the user is logged in to the enterprise system.

An access manager can also be configured to enforce certain modes of connectivity between remote devices (e.g., an enterprise resource or other enterprise server) and the container. For example, the access manager can require that data received from a remote device and/or sent from the container to the remote device be transmitted through tunnels, for example, as described above in connection with MicroVPN. Such application tunnels can use the tunneling mediator of the enterprise system. The access manager can require that all data transmitted to and from the container be encrypted. The client agent, access manager, or other component, can be configured to encrypt documents sent from the container and decrypt data sent to the container. Data in the container can also be stored in an encrypted form.

The container can be configured to prevent data from being used by unauthorized applications or components of the mobile device or other devices. For instance, an application having authorization to access documents from the container can be programmed to prevent a user from copying data and pasting it into another file or application interface, or locally saving the data as a new file outside of the container. Similarly, the container can be associated with a document viewer and/or editor that does not permit such copy/paste and local save operations. Moreover, the access manager can be configured to prevent such copy/paste and local save operations. Further, the container and applications authorized to access data from the container can be configured to prevent users from attaching such documents to emails or other forms of communication.

An application can be programmed to write enterprise-related data only into the container. For instance, the application's source code can be provided with the resource name of the container (e.g., via the client agent and as specified by policy). Similarly, an enterprise resource can be configured to send data only to one or more containers. Storing data to the container can occur automatically, for example, under control of the application, the client agent, or the like. An example of storing data to a container will be discussed below in connection with FIG. 8.

In some variations, a managed application may include a container that stores, for example, data used/generated by a remoted or virtualized application. In such variations, for example, a secure connection (e.g., a microVPN) may connect the container included in the managed application to one or more data sources (e.g., the source where the application is being remoted or virtualized), including sources located behind an access gateway.

In further variations, the managed application may be a virtualized application and the policy may specify a container that will store the data used/generated by the virtualized application. Accordingly, as the virtualized application generates data, the data is stored to the container.

In some embodiments, a secure container can be located remotely from the mobile device. In such embodiments, the policy may specify the location of the remote container. Data that is meant to be stored in the secure container or read/write operations that are being redirected to the secure container may be transferred to the remote container via a secure container, such as a microVPN tunnel or other type of application-specific VPN tunnel.

In some embodiments, a container may be configured based on an industry-specific policy, such as a policy for a healthcare industry or a finance industry. When configured by such policies, the data generated by an application that is, for example, also assigned to the policy for the healthcare industry can be saved to the container specified by the policy for the healthcare industry.

In some variations, the policy may specify multiple containers that can be used by the application when needing to store data. For example, a managed application may store to a first container when at a particular geographic location (or other first criteria) but to a second container when at a different geographic location (or other second, but different, criteria). As a particular example, a doctor may use a managed application to input patient data, but the doctor may perform work at different hospitals. When at one hospital, the policy may be configured so that the managed application used by the doctor stores to a first container, but when at a second hospital, the policy may be configured so that the managed application used by the doctor stores to a second container. In this manner, if the doctor stops practicing at the first hospital, a selective wipe of the first container may be performed without deleting or otherwise affecting the data stored by the second container. Further details as to performing a selective wipe will be performed below in connection with FIG. 9.

Figure 8:
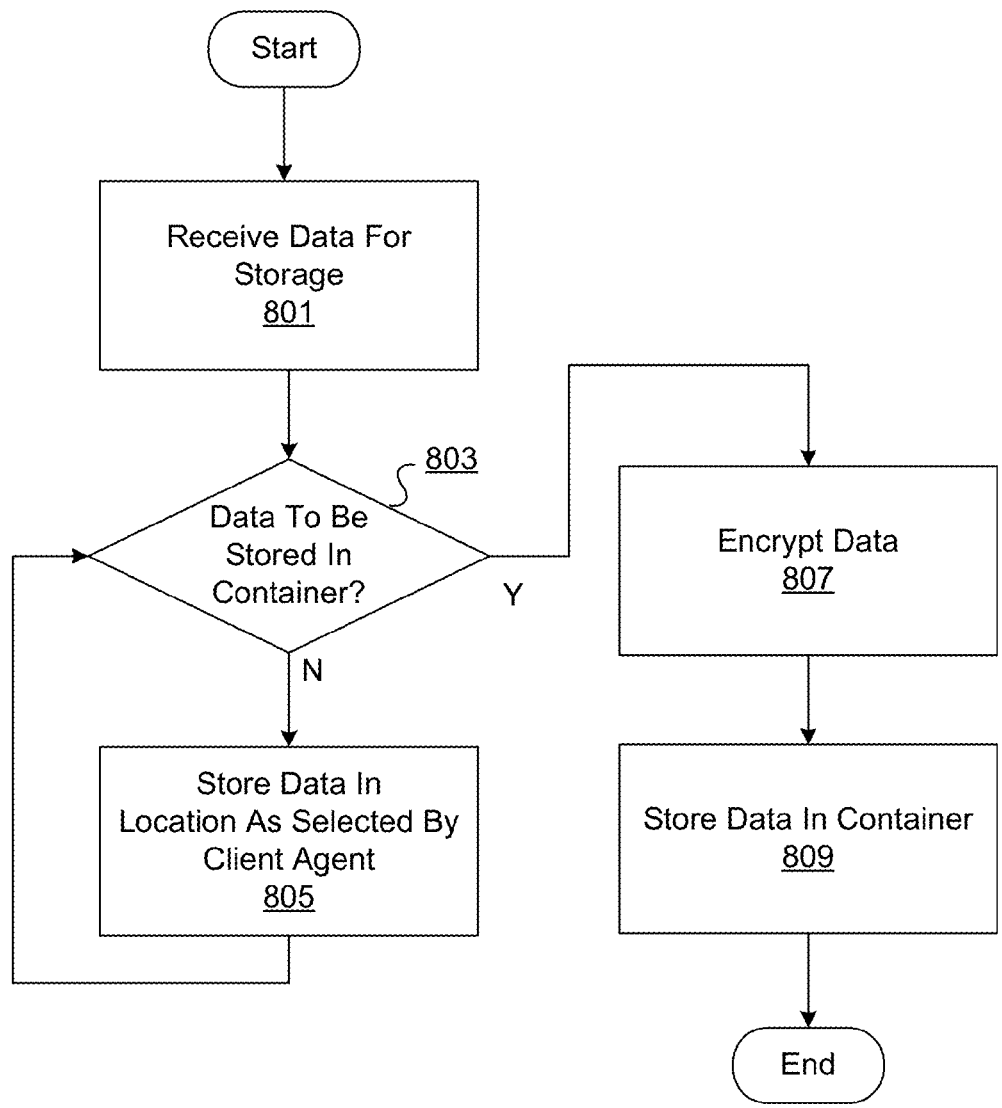
FIG. 8 illustrates an example method for storing data within a data vault or container in connection with a managed application in accordance with various aspects described herein.

Such private and shared data vaults can help prevent the spread of enterprise information to different applications and components of the mobile device, as well as to other devices. FIG. 8 illustrates an example method for storing data within a data vault or container in connection with a managed application. FIG. 8 illustrates a method that is performed by the processing circuitry of the mobile device when operating in accordance with various software constructs stored in the memory of the mobile device. In some arrangements, the example method of FIG. 8 may be performed by the client agent of the mobile device.

At step 801, the mobile device may receive data for storage. For example, access gateway, or other enterprise computing device, can transmit documents or other data to the mobile device, which upon receipt is to be stored at the mobile device. As used in this context, the data received at step 801 can comprise any form of data, such as a computer-readable file or document, text, audio, video, and/or other types of information or media. The data can comprise any single one or combination of these media types.

At step 803, the mobile device may determine whether the data is to be stored in a container. This may include accessing a policy stored by the mobile device, analyzing the policy to determine whether the policy specifies a particular container or not, and proceeding accordingly. The policy may also further specify default action or different destinations for the data based on the source that transmitted the data (e.g., data received from the access gateway is always stored in a secure container, data received from the authentication server is stored in a container dedicated to authentication) and/or based on the type of data received (e.g., data that includes audio or video is to be stored in a secure container for media, data that includes a document is to be stored in a secure container for documents, data that includes a policy is to be stored in a secure container for policies).

For example, if the mobile device determines that the policy specifies a particular container, the mobile device may determine that the data is to be stored in a container and, accordingly, may proceed to step 807. Otherwise, the policy may not specify a container or a default storage action for this data and the mobile device may determine that the data is not to be stored in a container and, accordingly, may proceed to step 805. At step 805, the data may be stored in a location as specified by the client agent. In some instances, the mobile device (or the client agent) may store the data in a download folder commonly provided by a mobile device's operating system or within an unmanaged partition of the mobile (as discussed in connection with FIG. 5). In others, the mobile device (or client agent) may store the data in a default secure container (e.g., the private data vault of the application), which may require first encrypting the data in a manner similar to step 807.

At step 807, the mobile device may encrypt the data. In some arrangements, the encryption method and key may be specified by a policy. Further, the key may have been received via the access gateway. Encrypting the data may include accessing one or more other secure containers on the mobile device. For example, the keys may be stored in a secure container for encryption/decryption keys and the key may be obtained by accessing such a container.

At step 809, the mobile device may store the data, which is now encrypted, within a container (e.g., the container specified by the policy, as determined in step 803), such as those illustrated in any of FIGS. 5-7 (e.g., container 528 of FIG. 5, the app private data vaults or shared data vaults of FIG. 6, and vaults 715, 720 of FIG. 7).

The container, in connection with the above-described steps and as described further above in connection with FIGS. 5-7, may assist in preventing unauthorized applications and other components of the mobile device from accessing information within the container. For enterprises that allow users to use their mobile device for accessing, storing, and using enterprise data, providing containers helps to secure the enterprise data. For instance, a container can centralize enterprise data in one location on each device, and can facilitate selective or complete deletion of enterprise data from the device.

Figure 9:
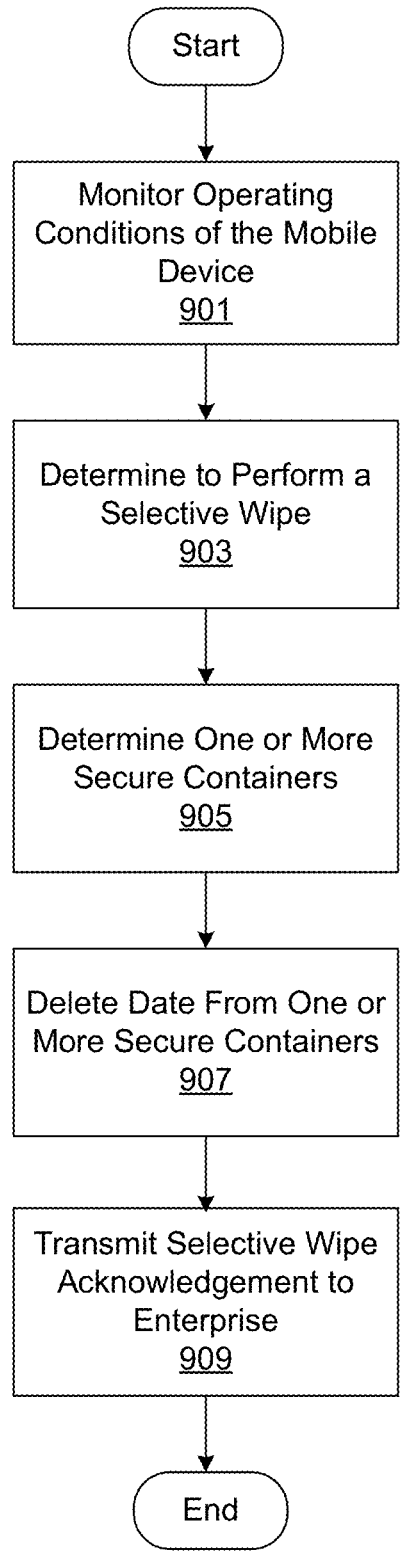
FIG. 9 illustrates an example method suitable for performing a selective wipe of data from one or more secure containers of a mobile device in accordance with one or more aspects of the disclosure.

FIG. 9 illustrates an example method for performing a deletion of data from a mobile device. In particular, FIG. 9 illustrates an example method suitable for performing a selective wipe of data from one or more secure containers of a mobile device. Additionally, FIG. 9 illustrates a method that is performed by the processing circuitry of the mobile device when operating in accordance with various software constructs stored in the memory of the mobile device. In some arrangements, the example method of FIG. 9 may be performed by the client agent of the mobile device.

At step 901, a mobile device may monitor operating conditions of the mobile device. Embodiments described herein may be able to selectively (and remotely) wipe a user's mobile device of enterprise application(s) and corporate data when, for example, the user discontinues employment or violates a corporate policy (such as if they jailbreak their device or otherwise use it in a disallowed configuration). Accordingly, the mobile device may need to monitor for such conditions that violate corporate policy or otherwise would cause a selective wipe to be performed.

At step 903, the mobile device may determine to perform a selective wipe of data associated with one or more managed applications based on the monitored conditions. Such a determination may be performed in various ways. For example, if attempts are made to enter a valid passcode is failed a threshold number of consecutive times (e.g., 5 or 10), the mobile device may determine to perform a selective wipe. If the application that is associated with the private data vault is uninstalled, the mobile device may determine to perform a selective wipe.

In some embodiments, the enterprise's IT department can cause the mobile device to make such a determination by remotely issuing a wipe command to the device (e.g., via the access gateway). As another condition, when an application is switched from a managed application to an unmanaged application (e.g., the application switches from a managed mode of operation to an unmanaged mode of operation) or is switched from being stored in a managed partition of the mobile device to an unmanaged partition, the mobile device may determine to perform a selective wipe. Other conditions include determining to perform a selective wipe based on a user's attempt to jailbreak their device or otherwise use it in a disallowed configuration, or attempting to access enterprise data in a manner that violates temporal or geographic restrictions placed on such access.

Another condition is related to a secure container serving as a temporary repository for documents and other data sent to the mobile device. Enterprise resources may be configured to send data to a container (e.g., via application tunnels) on a onetime or periodic basis. For example, a sales-related enterprise resource may be programmed to send sales-related documents (e.g., most recent price sheets) every morning to a particular secured container of mobile devices registered for a team of users having sales-related roles (e.g., sales persons) in the enterprise. The sales-related documents can have document access policies such that the documents will "self-destruct" (e.g., cause to be deleted or otherwise selectively wiped from the container) at a certain time or at the expiration of a time period beginning at a defined event (e.g., the user's opening of a document).

Enterprise resources that send documents to one or more secure containers may be integrated with other repositories for the purpose of sending documents from such repositories to the containers, such as by integrating with other enterprise systems (e.g., enterprise document repositories such as a Microsoft Sharepoint™ repository) or a third-party cloud computing system (e.g., a Box.net™ repository). A selective wipe may be performed based on such repositories sending documents to a secure container. Alternatively, a selective wipe may be performed based on lifetime criteria associated with documents received from such repositories (e.g., a received document may be stored in the container for 2 days, after which a selective wipe will be performed).

A backup service may be configured for a secure container. For example, a secure container may periodically send its contents to a secure backup location (e.g., via a microVPN to the access gateway and/or another location that is behind the access gateway). After the backup process has been completed, the secure container may be selectively wiped.

Any of the above (or other) determinations to perform a selective wipe may be based on the policies stored by the mobile device. For example, when forming the determination to perform a selective wipe, the mobile device may compare the monitored conditions to one or more policies and if the conditions match a condition specified in the policy that commands a selective wipe, the mobile device may determine to perform a selective wipe.

At step 905, the mobile device may determine one or more secure containers for the selective wipe. For example, the mobile device may determine which secure containers contain the data of the one or more managed applications. This determination may be based on information specified by policy or based on information known by the client agent, or as specified by a command received by the mobile device from the enterprise network.

At step 907, the mobile device may delete or otherwise make inaccessible the data of the one or more secure containers. For example, a container may be configured to allow the client agent or mobile device to read from, write to, and/or delete information from the container's file system. Deleting data from the container can include deleting actual data stored in the container, deleting pointers to data stored in the container, deleting encryption keys used to decrypt data stored in the container, and the like. The container can enable some or all of the enterprise data stored in its file system to be deleted without modifying other data stored on the mobile device outside of the container.

At step 909, the mobile device may transmit a selective wipe acknowledgement to the enterprise. Such an acknowledgement may provide an indication to the enterprise that the selective wipe was successful. The acknowledgement may include a listing of applications and/or listing of secure containers that were affected/deleted by the selective wipe. Upon receipt, the enterprise (e.g., access gateway) may update its stored records accordingly.

Figure 10:
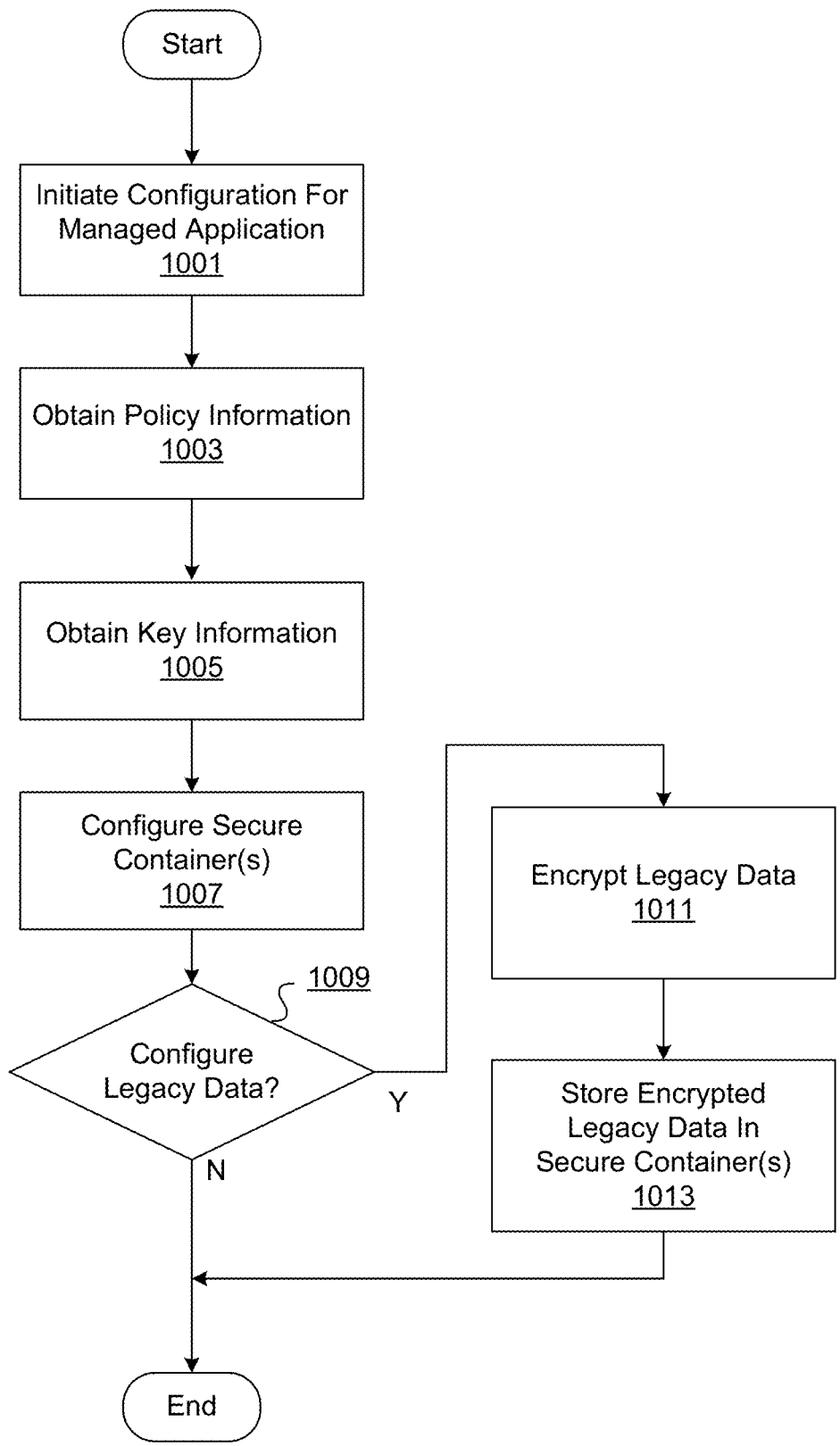
FIG. 10 illustrates an example process in which a managed application is configured in accordance with various aspects of the disclosure.

As discussed above, the application management framework that is delivered with the managed application may configure itself (e.g., with the client agent's assistance). When being configured, however, the user may have legacy data that does not satisfy the requirements of the application management framework disclosed herein. For example, the mobile device may have previously used a different corporate e-mail application that did not encrypt the data of the inbox and the like, and the user would prefer to have access to the inbox data. Accordingly, such application data will have to be processed when the application is configured. FIG. 10 illustrates an example process in which a managed application is configured. Further, FIG. 10 illustrates a method that can be performed by the processing circuitry of the mobile device when operating in accordance with various software constructs stored in the memory of the mobile device. In some arrangements, the example method of FIG. 10 may be performed by the client agent of the mobile device.

At step 1001, the mobile device may initiate a configuration process for a managed application. In some instances, the configuration may not occur until the application first attempts to access an access resource or access gateway. In others, the configuration may occur when the managed application is installed on the mobile device. Configuration of the application may, in some embodiments, may include wrapping the application (e.g., via secure application wrapper 520 of FIG. 5). Additional details of the configuration process will be discussed in connection with the remaining steps of FIG. 10.

At step 1003, the mobile device may obtain policy information for the managed application. In some arrangements, the mobile device may already have policy information for the managed application stored on the mobile device. If the policy information does not exist, the mobile device may transmit a request to the access gateway for the policy information. Alternatively, if the policy information does exist, the mobile device the mobile device may check for updated policy information by transmitting a request to the access gateway for an update to the policy information. Subsequently, the policy information may be received responsive to a request of the mobile device for the policy information or for an update to policy information. Alternatively, the policy information may be received responsive to an authentication of the user, application or mobile device.

At step 1005, the mobile device may obtain key information for the managed application. The key information may be for use with reading, writing or otherwise accessing secure containers on the mobile device when the managed application is running. The key information may include one or more encryption and/or decryption keys for the secure containers. The policies included in the policy information that was obtained at step 1003 may define what secure containers are to be used as well as their resource names or identifiers.

In some instances, obtaining the key information may be simply accessing the key information stored on the mobile device. However, in some instances (e.g., when the key information is not stored on the mobile device or the key information is to be updated), the mobile device may transmit a request to the access gateway for the key information. The request may include information to identify which encryption and decryption keys are needed for the application. For example, keys may be assigned based on a tuple of user, device, and application or application group, and the request for the key information may include information identifying the tuple. In some embodiments, the request may include a user credential, such as a certificate or single-sign-on (SSO) credential. In some variations, the user-credential may be the tuple or be included as part of the above-discussed tuple. Some information, like application group, may be specified by a policy that was obtained at step 1003.

In some arrangements, the key information may be transmitted as part of the policy information, thus steps 1003 and 1005 may be combined one or more of such arrangements. Additionally, the policy and key information may, in some variations, be received via a VPN tunnel, such as a MicroVPN (discussed above).

At step 1007, the mobile device may configure one or more secure containers. For example, one or more secure containers may be defined by the policy for the managed application. In some instances, the policy may include a definition of a private container (e.g., an app private data vault as illustrated in FIG. 6) and/or a shared container (e.g., a shared data vault as illustrated in FIG. 6). Based on the policy, the mobile device may determine whether the containers have been properly created and configured on the mobile device. If a container does not already exist, a new empty vault is initialized, including the file system for the container (e.g., empty directory tree). The access manager for the container may also be configured.

The policy-aware interception layer may also be configured to be aware of the secure containers. For example, the policy-aware interception layer may be configured with information linking the identifiers or resource identifiers for the secure containers to one or more API calls that will be issued by the application during execution and may be configured with the locations of the keys that will be used when encrypting/decrypting data to/from the application. In such a way, the policy-aware interception layer may intercept such calls and redirect the calls to the appropriate secure container in accordance with the policy and without the application being aware of the interception (see, e.g. FIG. 7).

At step 1009, the mobile device may determine whether legacy data for the managed application is to be configured for the application. In some instances, this determination may be based on the policy for the application. For example, legacy data may be stored on the mobile device (e.g., inbox data for an e-mail client that the managed application is replacing may be stored on the mobile device). Accordingly, an IT administrator may configure the policy so that, for example, a location of the legacy data is defined within the policy and/or an indication that the mobile device is to transfer legacy data for the managed application when configuring the application. The policy may specify locations for the legacy data such as external data storage locations, folders located on the mobile device, or secure containers located on the mobile device. The policy may also define an amount of legacy data to move to the secure containers (e.g., a maximum amount of raw data, a number of days of e-mails, all data, etc.).

In some variations, determining to configure legacy data may be based on information in addition to policy-based criteria. For example, the client agent may be configured to perform a search (e.g., a recursive search) of the application sandbox for any legacy data associated with the managed application and based on the search convert the legacy data as required. Additionally, the client agent may be configured with an exclusion list (e.g., a list of folders that should not be searched/accessed for legacy data).

In some arrangements, the legacy data may be stored remotely, such as by an enterprise resource. The policy may indicate the location of the enterprise resource that stores the legacy data.

If the mobile device determines that legacy data for the managed application is to be configured for the application, the method may proceed to step 1011. Otherwise, the method may end resulting in the managed application being configured for execution on the mobile device along with the policy information, key information and secure containers used when executing the application.

At step 1011, the mobile device may encrypt the legacy data. In some variations, the encryption may be performed in accordance with the policy. For example, the mobile device may retrieve, from the location where the legacy data is stored, an amount of data in accordance with the policy. The mobile device may then encrypt the data in accordance with the policy (e.g., using the protocols specified by the policy and using the keys specified by the policies). Some data may be encrypted using different keys based on which of the one or more secure containers they will be stored into.

At step 1013, the mobile device may store the legacy data, which is now encrypted, in one or more secure containers. Such storing may also be in accordance with the policy. For example, some data may be specified as being stored in one container (e.g., a private container), while other data may be specified as being stored in a different container (e.g., a shared container). Accordingly, the data may be stored into the appropriate containers in their encrypted form. Such storage may be performed by updating or creating references to the location of the encrypted data in the secure container's file system.

In some instances, after steps 1011 and 1013 have been successfully performed, any legacy data that remains on the mobile device in its unencrypted form may be deleted from the mobile device.

While the above method describes configuring data vaults when initially configuring an application for execution on the mobile device, similar methods may be utilized when policy information changes for the mobile device. Indeed, the mobile device (or the client agent) may analyze updated policy information for changes to the encryption/decryption policies and/or the secure containers that are used when executing the managed application. Based on the changes, the mobile device may take various steps to ensure the policy is correctly enforced such as, for example, by changing the configuration of a secure container, create a new container, delete an unused container, re-encrypt data, decrypt data, delete data and/or move data to different storage locations.

Figure 11:
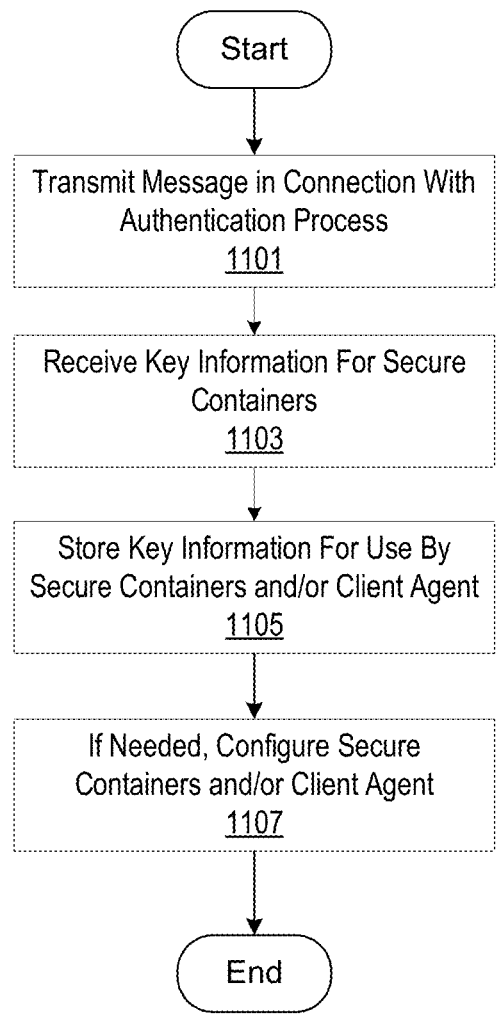
FIG. 11 illustrates an example method for providing encryption and decryption keys for secure containers in accordance with one or more aspects described herein.

As discussed above, when a user executes a managed application on the mobile device, the user is typically challenged to authenticate their corporate identity along with passwords and other factors as dictated by corporate policy. After having strongly authenticated the user, device, and application, the access manager components of the system may verify that the user is entitled to the application and download the configured policies for this specific application and user. Keys and other data that are needed to access/provide secure containers may also be downloaded to the mobile device. FIG. 11 illustrates various aspects for providing authentication in connection with accessing secure containers. In particular, FIG. 11 illustrates an example method for providing encryption and decryption keys for secure containers. Additionally, FIG. 11 illustrates a method that is performed by the processing circuitry of the mobile device when operating in accordance with various software constructs stored in the memory of the mobile device. In some arrangements, the example method of FIG. 11 may be performed by the client agent of the mobile device.

At step 1101, the mobile device may transmit a message in connection with authenticating a user, application or mobile device with an access gateway. For example, the message may be in connection with an initial authentication process that authenticates a user prior to allowing a managed application, which is executing on a mobile device, access to enterprise resources (e.g., a message transmitted to cause the mobile device or user to log into the enterprise to access the enterprise resources). In others, the message may be in connection with authenticating the user or mobile device prior to allowing a managed application to be downloaded.

In some variations, the message may be transmitted as part of a periodic update of key information for secure containers. For example, periodically the keys for the secure containers may need to be refreshed (e.g., as dictated by the time to live policy setting for the keys). When refreshing, as long as the user has maintained an active logon with the access gateway, the refreshing of keys can occur without user interaction. If user logs off or their logon session expires, then the refreshing of keys will need to be fully authenticated again (e.g., request the user to supply the authentication credentials, such as username and password or certificate, again). In such variations, the message may include a request for key information and may include an identification of the user, application or mobile device so that the access gateway can confirm authorization to the updated key information (e.g., based on the active logon session).

At step 1103, the mobile device may receive key information for use with reading, writing or otherwise accessing secure containers on the mobile device. For example, keys may be assigned based on a tuple of user, device, and application or application group. An enterprise key management server or the access gateway may have knowledge of the keys and the associations of the keys to the specific users, devices, applications, or application groups. Accordingly, the key management server or access gateway may determine the key information that is to be sent to the mobile device and may transmit the key information to the mobile device.

Accordingly, the key information received by the mobile device may include the encryption keys and/or decryption keys required to read, write or otherwise access secure containers, including both shared vaults and private vaults (see, e.g., FIG. 6 and FIG. 7). The key information may include information that identifies which users, devices, applications, application groups, and/or secure containers each key is to be used for. In some variations, the key information may take the form of a listing of secure container identifiers with each identifier being associated with a respective encryption key and a decryption key for use with that secure container.

In some arrangements, the key information may be transmitted as part of an update to the policies stored by the mobile device. Additionally, the key information may, in some variations, be received via a VPN tunnel, such as a MicroVPN (discussed above).

Upon receipt of the key information, the mobile device may store the key information at step 1105 so that, for example, the key information can be used by the secure containers and/or client agent. In some arrangements, the key information may be stored in a secure container or, for example, in the managed partition of the mobile device. Additionally, in some instances, the secure containers and client agents may need further configuring based on the key information. Such configuring may be performed at step 1107. For example, if the key information specifies keys for secure containers that are not yet created by the mobile device, the mobile device may determine to create one or more secure containers based on the key information (e.g., based on one of the secure container identifiers on the listing of secure container identifiers not having a matching container created on the mobile device) and, accordingly, create the one or more secure containers (including the file system and access manager for the secure container) and configure the client agent to facilitate accessing the secure container.

Figure 12:
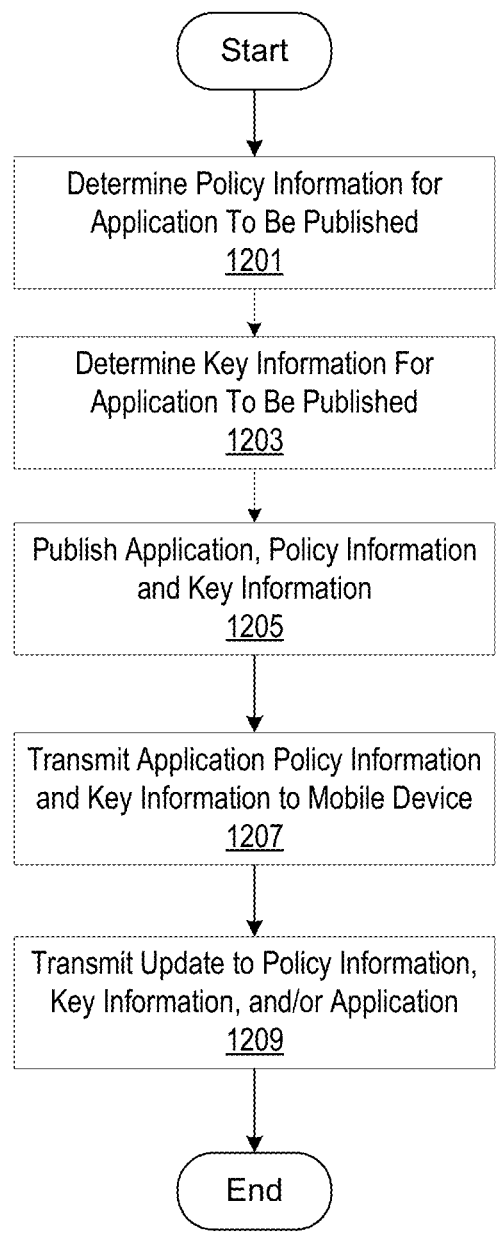
FIG. 12 illustrates an example method for publishing a managed application in connection with various aspects described herein.

As discussed above, after preparing the application, the managed application may be uploaded to a server for the purpose of publishing the application for the enterprise users to consume, such as via an application store. As part of this application publishing workflow, an IT administrator or other user may choose policies that apply to the application and associated user roles. Once uploaded and configured, the applications may be made available to organization's employees to peruse and install based on their role within the organization. Alternatively, such applications can be pushed directly to mobile devices for employees who have enrolled their device with a corporate MDM server. FIG. 12 illustrates an example method for publishing a managed application such that, for example, a user is able to download the application and any linked policy information and key information. Various steps may be performed by one or more computing devices of an enterprise network, such as an access gateway or application store server (e.g., app store 578 of FIG. 5).

At step 1201, policy information may be determined and linked to an application to be published. The policy information may include one or more policies for the application and each policy may be specific to a different user role associated with the enterprise (e.g., one policy for a sales employee; a different policy for a designer, etc.) or application group. As discussed throughout this disclosure, the policies can include various constraints to be enforced by the mobile device in connection with the application, which may be meant to be executed as a managed application on the mobile device. The policy information may include one or more secure container identifiers that will be used in connection with reading/writing or otherwise processing data when the application is executed by the mobile device. The secure containers may be, for example, an identifier for a private data vault and/or a shared data vault. In some arrangements, an IT administrator or other user may select or otherwise configure the content of the policy information (e.g., via a graphical interface, the IT administrator or other user may provide input that causes the policy information to be configured accordingly).

At step 1203, key information may be determined and linked to the application to be published. The key information may include one or more encryption and/or decryption keys for reading, writing or otherwise accessing the one or more secure containers identified in the policy information. In some arrangements, an IT administrator (or other user) of the enterprise may select or otherwise configure the content of the key information (e.g., via a graphical interface, the IT administrator or other user may provide input that causes the key information to be configured accordingly).

In some arrangements, the key information may be included in the policy information.

At step 1205, the application, policy information and key information may be published or otherwise made accessible for download to a mobile device. For example, the application, policy information and key information may be published to an application store.

At step 1207, the application, policy information and key information may be transmitted to a mobile device. Such transmission may, in some embodiments, be performed responsive to a request to download the application. In others, it may be performed responsive to a push command that automatically causes the application, policy information and key information to the mobile device (e.g., based on a registration in such a push service).

Additionally, at step 1209, an update to the policy information, key information and/or application may be transmitted to the mobile device. For example, the mobile device may be registered in an update service with the application store. Accordingly, if the policy information or key information that is published to the application store is updated, the updated policy or key information may be transmitted to the mobile device (e.g., based on the registration in the update service). In some variations, transmission of an update to the policy information and/or key information may be performed without updating the application. Further, the user of the mobile device may be unaware of the update to the policy and/or key information.

The transmissions of steps 1207 and 1209 may, in some variations, be performed using one or more VPN tunnels, such as a MicroVPN (discussed above).

Although the subject matter has been described in language specific to structural features and/or methodological acts, it is to be understood that the subject matter defined in any claim 1s not necessarily limited to the specific features or acts described above. Rather, the specific features and acts described above are described as some example implementations of the following claims.

We claim:

1. A method, comprising:
configuring a mobile device such that a managed application of the mobile device is able to be executed in accordance with policy information that defines a management framework for executing the managed application by at least:
configuring, based on at least one first setting of the policy information, a private secure container, which is to be private to the managed application, such that a first set of read or write operations from the managed application is to be redirected to the private secure container;
configuring, based on at least one second setting of the policy information, a shared secure container, which is to be accessible by the managed application and at least one other managed application of the mobile device, such that a second set of read or write operations from the managed application is to be redirected to the shared secure container;
determining that legacy data, which is associated with an application of the mobile device that was executed not in accordance with the management framework, is to be configured for the managed application;
responsive to determining that the legacy data is to be configured for the managed application, encrypting the legacy data, resulting in encrypted legacy data;
storing a first set of the encrypted legacy data in the private secure container; and
storing a second set of the encrypted legacy data in the shared secure container.

2. The method of claim 1, further comprising:
obtaining, via an access gateway, key information that includes one or more keys for encrypting or decrypting data of the private secure container or the shared secure container.

3. The method of claim 1, wherein the at least one first setting instructs that the private secure container is to be configured on the mobile device such that the first set of read or write operations from the managed application is to be redirected to the private secure container; and
wherein the at least one second setting instructs that the shared secure container is to be configured on the mobile device such that the second set of read or write operations from the managed application is to be redirected to the private secure container.

4. The method of claim 1, further comprising:
intercepting a read or write operation from the managed application while the managed application is executing on the mobile device, wherein the read or write operation comprises an application programming interface (API) call available via a file system of the mobile device, wherein the file system of the mobile device is different from both a file system of the private secure container and a file system of the shared secure container, and wherein the read or write operation indicates a type of data to be read or written;
determining, based on the policy information and the type of data to be read or written, whether to redirect the read or write operation to the shared secure container or the private secure container; and
based on the determining, redirecting the read or write operation to the private secure container or the shared secure container.

5. The method of claim 1, wherein the private secure container and the shared secure container are each a logical interface into which data is read from and written to in an encrypted form.

6. The method of claim 1, wherein the private secure container is accessible to only the managed application.

7. The method of claim 1, wherein the shared secure container is accessible to only the managed application and the at least one other managed application, wherein the policy information is assigned to the managed application and the at least one other managed application.

8. A method, comprising:
configuring a mobile device such that a managed application of the mobile device is able to be executed in accordance with policy information that defines a management framework for executing the managed application by at least:
configuring, based on at least one first setting of the policy information, a private secure container, which is to be private to the managed application, such that a first set of read or write operations from the managed application is to be redirected to the private secure container, and
configuring, based on at least one second setting of the policy information, a shared secure container, which is to be accessible by the managed application and at least one other managed application of the mobile device, such that a second set of read or write operations from the managed application is to be redirected to the shared secure container;
intercepting a first read or write operation from the managed application while the managed application is executing on the mobile device, wherein the first read or write operation comprises an application programming interface (API) call available via a file system of the mobile device, wherein the file system of the mobile device is different from both a file system of the private secure container and a file system of the shared secure container;
determining, based on the policy information, whether to redirect the read or write operation to the shared secure container or the private secure container; and
based on the determining, redirecting the first read or write operation to the private secure container or the shared secure container.

9. The method of claim 8, wherein configuring the shared secure container includes configuring the file system of the shared secure container and an access manager of the shared secure container, and wherein the method further comprises:
managing access to the shared secure container via a client agent installed on the mobile device.

10. The method of claim 8, wherein the first read or write operation includes a read operation of particular data, and the method further comprises:
retrieving an encrypted form of the particular data from the private secure container based on the file system of the private secure container and an access manager of the private secure container;
decrypting, using a key received via an access gateway, the encrypted form of the particular data, resulting in a decrypted form of the particular data; and
providing the decrypted form of the particular data to the managed application.

11. The method of claim 8, wherein the first read or write operation includes a write operation of particular data, and the method further comprises:

encrypting, using a key received via an access gateway, the particular data, resulting in an encrypted form of the particular data; and providing, to the private secure container, the encrypted form of the particular data for storage based on the file system of the private secure container and an access manager of the private secure container.

12. The method of claim 8, further comprising initiating a configuration process for the managed application, and wherein the configuring of the mobile device is performed responsive to the initiating.

13. The method of claim 8, further comprising:

configuring a policy-aware interception layer to perform the intercepting of the first read or write operation.

14. An apparatus, comprising:

at least one processor; and memory storing executable instructions configured to, when executed by the at least one processor, cause the apparatus to:

configure the apparatus such that a managed application of the apparatus is able to be executed in accordance with policy information that defines a management framework for executing the managed application by at least:

configuring, based on at least one first setting of the policy information, a private secure container, which is to be private to the managed application, such that a first set of read or write operations from the managed application is to be redirected to the private secure container, and configuring, based on at least one second setting of the policy information, a shared secure container, which is to be accessible by the managed application and at least one other managed application of the apparatus, such that a second set of read or write operations from the managed application is to be redirected to the shared secure container;

intercept a first read or write operation from the managed application while the managed application is executing on the apparatus, wherein the first read or write operation comprises an application programming interface (API) call available via a file system of the apparatus, wherein the file system of the apparatus is different from both a file system of the private secure container and a file system of the shared secure container;

determine, based on the policy information, whether to redirect the read or write operation to the shared secure container or the private secure container; and based on the determination of whether to redirect the read or write operation to the shared secure container or the private secure container, redirect the first read or write operation to the private secure container or the shared secure container.

15. The apparatus of claim 14, wherein configuring the shared secure container includes configuring the file system of the shared secure container and an access manager of the shared secure container, and wherein the executable instructions are configured to, when executed by the at least one processor, cause the apparatus to:

manage access to the shared secure container via a client agent installed on the apparatus.

16. The apparatus of claim 14, wherein the first read or write operation includes a read operation of particular data, and wherein the executable instructions are configured to, when executed by the at least one processor, cause the apparatus to:

retrieve an encrypted form of the particular data from the private secure container based on the file system of the private secure container and an access manager of the private secure container;

decrypt, using a key received via an access gateway, the encrypted form of the particular data, resulting in a decrypted form of the particular data; and provide the decrypted form of the particular data to the managed application.

17. The apparatus of claim 14, wherein the first read or write operation includes a write operation of particular data, and wherein the executable instructions are configured to, when executed by the at least one processor, cause the apparatus to:

encrypt, using a key received via an access gateway, the particular data, resulting in an encrypted form of the particular data; and provide, to the private secure container, the encrypted form of the particular data for storage based on the file system of the private secure container and an access manager of the private secure container.

18. The apparatus of claim 14, wherein the executable instructions are configured to, when executed by the at least one processor, cause the apparatus to:

initiate a configuration process for the managed application; and proceed to configure the apparatus such that the managed application is able to be executed in accordance with the policy information responsive to the initiation of the configuration process.

19. The apparatus of claim 14, wherein the executable instructions are configured to, when executed by the at least one processor, cause the apparatus to:

configure a policy-aware interception layer to perform the interception of the first read or write operation.

20. The apparatus of claim 14, wherein the apparatus comprises a mobile device.

* * * * *